(12) United States Patent
Mac Brough

(10) Patent No.: US 11,240,010 B2
(45) Date of Patent: Feb. 1, 2022

(54) RANDOM ORACLES IN OPEN NETWORKS

(71) Applicant: RIPPLE LABS INC., San Francisco, CA (US)

(72) Inventor: Ethan Mac Brough, San Francisco, CA (US)

(73) Assignee: Ripple Labs Inc., San Francisco, CA (US)

( * ) Notice: Subject to any disclaimer, the term of this patent is extended or adjusted under 35 U.S.C. 154(b) by 520 days.

(21) Appl. No.: 16/278,031

(22) Filed: Feb. 15, 2019

(65) Prior Publication Data

US 2019/0253242 A1    Aug. 15, 2019

Related U.S. Application Data

(63) Continuation-in-part of application No. 16/273,053, filed on Feb. 11, 2019.

(Continued)

(51) Int. Cl.
| | | |
|---|---|---|
| H04L 29/06 | (2006.01) | |
| H04L 9/08 | (2006.01) | |
| H04L 9/06 | (2006.01) | |
| H04L 9/32 | (2006.01) | |
| G06Q 20/38 | (2012.01) | |
| G06Q 20/06 | (2012.01) | |

(52) U.S. Cl.
CPC ......... *H04L 9/085* (2013.01); *G06Q 20/0658* (2013.01); *G06Q 20/389* (2013.01); *H04L 9/0637* (2013.01); *H04L 9/0869* (2013.01); *H04L 9/3239* (2013.01); *H04L 9/3247* (2013.01); *H04L 9/3255* (2013.01); *G06Q 2220/00* (2013.01); *H04L 2209/38* (2013.01); *H04L 2209/56* (2013.01)

(58) Field of Classification Search
CPC ..... H04L 9/085; H04L 9/0637; H04L 9/0869; H04L 9/3239; H04L 9/3255; H04L 9/3247
USPC .......................................... 713/155
See application file for complete search history.

(56) References Cited

U.S. PATENT DOCUMENTS

| | | | |
|---|---|---|---|
| 7,389,416 B2 * | 6/2008 | Cachin | H04L 9/085 |
| | | | 713/163 |
| 2002/0129087 A1 | 9/2002 | Cachin | |
| 2019/0251007 A1 * | 8/2019 | MacBrough | H04L 9/3239 |

OTHER PUBLICATIONS

International Search Report and Written Opinion for Application No. PCT/US19/17556, dated May 9, 2019, 8 pages.

(Continued)

*Primary Examiner* — Longbit Chai
(74) *Attorney, Agent, or Firm* — Butzel Long

(57) ABSTRACT

Systems and techniques are provided for random oracles in open networks. A node computing device of an open network may choose a random secret. The random secret may be a numeric or alphanumeric value. The node computing device may distribute shares of the random secret to node computing devices that are members of essential subsets for the node computing device. The node computing device may receive a share of a random secret from a second node computing device. The node computing device may be a member of an essential subset of the second node computing device. The node computing device may sign a deterministic seed message using the share of the random secret received from the second node computing device to generate a signature share. The node computing device may reveal the signature share and may receive a random value in response.

20 Claims, 12 Drawing Sheets

Related U.S. Application Data

(60) Provisional application No. 62/631,775, filed on Feb. 17, 2018, provisional application No. 62/629,535, filed on Feb. 12, 2018.

(56) References Cited

OTHER PUBLICATIONS

Miller, A. et al. The honey badger of BFT protocols. In Proceedings of the 2016 ACM SIGSAC Conference on Computer and Communications Security (pp. 31-42). ACM 2016 [retrieved on Apr. 9, 2019]. Retrieved from the Internet: <URL: https://eprint.iacr.org/2016/199.pdf>.

Cachin, C. et al. Secure and efficient asynchronous broadcast protocols. In Annual International Cryptology Conference (pp. 524-541). Springer, Berlin, Heidelberg 2001 [retrieved on Apr. 9, 2019]. Retrieved from the Internet: <URL: https://iacrorg/archive/crypto2001/21390524.pdf>.

Schwartz, D. et al. The ripple protocol consensus algorithm. Ripple Labs Inc White Paper, 5 2014 [retrieved on Apr. 9, 2019]. Retrieved from the Internet: <URL: https://pdfs.semanticscholar.org/02fb/ec530d3Ofadbae8bacd497788327f5604bb3.pdf>.

Mazieres, D. The Stellar consensus protocol: A federated model for internet-level consensus. Stellar Development Foundation. 2015 [retrieved on Apr. 9, 2019]. 2016 Retrieved from the Internet: <URL: https://www.stellar.orglpapers/stellar-consensus-protocol.pdf>.

Ramasamy, H. V. et al. Parsimonious asynchronous byzantine-fault-tolerant atomic broadcast. In International Conference on Principles of Distributed Systems (pp. 88-102). Springer, Berlin, Heidelberg 2005 [retrieved on Apr. 9, 2019]. Retrieved from the Internet: <URL: https://cachin.com/cdpapers/oabc.pdf>.

\* cited by examiner

RANDOM ORACLES IN OPEN NETWORKS

BACKGROUND

Decentralized databases, such as blockchain databases, may rely on consensus mechanisms to determine what changes are made to the database in order to ensure that the database is consistent across devices which store copies of some or all of the database. The network of devices that store and process changes to a decentralized database may be open, allowing any device to join and participate in the network. Some decentralized databases, such as those that are used to record cryptocurrency transactions for certain cryptocurrencies, use proof-of-work requirements to prevent an actor from gaining enough control of the network to validate changes to the decentralized database on its own. A proof-of-work requirement as part of a consensus mechanism for a decentralized database may require larger amounts of computational resources and may slow the rate at which changes can be made to the database. This may make processing transactions for a cryptocurrency whose decentralized database uses proof-of-work requirements in its consensus mechanism both slow and resource intensive.

The use of a consensus mechanism without a proof-of-work requirement may expose an open network to an actor gaining enough control of the network to validate changes to the decentralized database on its own. Consensus mechanisms that do not use a proof-of-work requirement and that prevent exposure to such an attack may allow for disagreement among devices in the network as to whether a change should be made to a decentralized database. These consensus mechanisms may only allow for a small amount of disagreement, and may also create conditions where the network cannot come to a consensus and gets stuck, requiring manual intervention.

Random oracles may be used in complete networks. A random oracle in a complete network may act as a black box that, when queried, returns a single common value from a sample space. The value returned by a random oracle in a complete network may be independent of the state of a node of the complete network that queried the random oracle at the time of the query.

BRIEF SUMMARY

In an implementation, a node computing device of an open network may choose a random secret. The random secret may be a numeric or alphanumeric value. The node computing device may distribute shares of the random secret to node computing devices that are members of essential subsets for the node computing device. The node computing device may receive a share of a random secret from a second node computing device. The node computing device may be a member of an essential subset of the second node computing device. The node computing device may sign a deterministic seed message using the share of the random secret received from the second node computing device to generate a signature share. The node computing device may reveal the signature share. The node computing device may receive a random value in response to revealing the signature share.

Systems and techniques disclosed herein may allow for random oracles in open networks. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
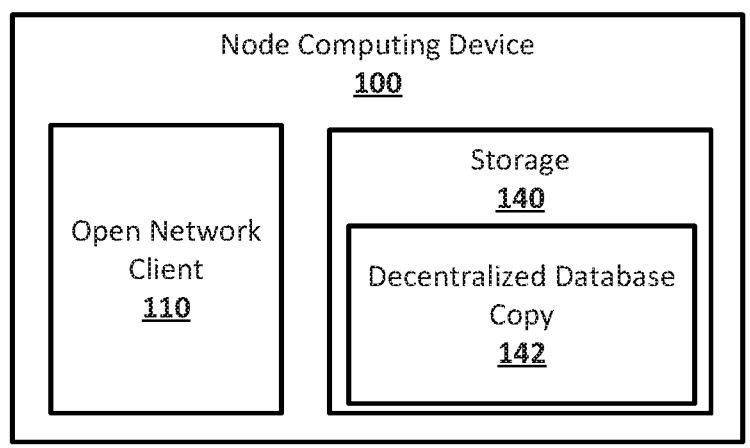
FIG. 1 shows an example system suitable for random oracles in open networks according to an implementation of the disclosed subject matter.

According to embodiments disclosed herein, Random oracles in open networks may allow for computing systems in an open network of computing to agree on the last changes made to a decentralized database of the open network before making changes to which computing systems of the open network belong to a validation network for the open network without exposing the open network to control by a malicious actor or risking a situation where an agreement on the last changes made to the decentralized database, resulting in the open network becoming stuck. An open network may include computing system which store a decentralized database. Unknown computing systems may be able to join the open network, and computing systems that are part of the open network may drop out of the open network. Communication between different computing systems in the open network may be blocked at various times. The computing systems in the open network may select a subset of the computing systems to serve as validation network for the open network. The computing systems in the validation network may validate and order updates to the decentralized database stored on the computing systems of the open network. When the validation network is detected to be failing, the computing systems in the open network may switch to a different subset of the computing systems to use as the validation network. Before a switch can be made, the computing systems in the open network may need to reach an agreement on the last updates that were made to the decentralized database. The computing systems in the open network may reach an agreement on the last updates that were made to the decentralized database by using external validity multi-valued Byzantine agreement (MVBA). This may ensure that computing systems in the open network which are not faulty may maintain consistent copies of the decentralized database as changes are made to the validation network, even when there are faulty systems in the open network that may interfere with the ability of the non-faulty computing systems to reach an agreement on the last updates made to the decentralized database.

A decentralized database may store data across a number of different computing systems in a network. The computing systems may each store a complete copy of the decentralized database or may store partial copies of the decentralized database. Updates may be made to the decentralized database. An update to the decentralized database may be generated by one of the computing systems in the open network and may be validated by a validation network before being applied to the decentralized database. A validated update may be applied to the decentralized database through broadcast of the validated update to the computing systems in the open network, which may then apply the update to their copies of the decentralized database.

A decentralized database may be, for example, a blockchain database. The decentralized database may be stored in the form of blocks, ordered by the sequence in which they were added to the decentralized database as amendments to the blockchain database. Each block may include a number of updates to the decentralized database. The updates may be ordered by the sequence in which they are to be applied to the decentralized database. For example, a blockchain for a cryptocurrency may act as a ledger for the cryptocurrency and may include blocks with updates that are transactions made using the cryptocurrency. The transactions may indicate amounts of cryptocurrency sent between different cryptocurrency accounts, or wallets. The transactions within a block may be ordered in the sequence in which the transactions are to be applied to the ledger for the cryptocurrency.

The network which stores the decentralized database may be an open network. Computing systems may be able to join and leave the open network at any time. For example, a computing system may be able to join an open network for a cryptocurrency blockchain database by downloading all, or a portion, of the cryptocurrency blockchain database and by running the appropriate software to interact with the other computing systems in the open network to ensure that the computing system's copy of the cryptocurrency blockchain database remains up-to-date. The computing system may also run appropriate software to conduct and validate individual transactions made using the cryptocurrency and to confirm blocks of transactions to be used to update the cryptocurrency blockchain database.

The ordering of updates within an amendment to a decentralized database may need to be consistent across computing systems that are applying the amendment to the decentralized database. If two computing systems in the open network for a decentralized database apply the same amendment, but with different ordering of the updates, their copies of the decentralized database may end up different. For example, a block to be added to a cryptocurrency blockchain database may include a number of transactions using the cryptocurrency that have occurred since the previous block was added to the cryptocurrency blockchain database. The ordering of the transactions within the block may be based on the sequence in which the transactions occurred. If computing systems in the open network for the cryptocurrency blockchain database disagree on the order in which the transactions occurred and update their copies of the cryptocurrency blockchain database using the transaction in a different order, this may result in disagreement of whether individual transactions are valid. The cryptocurrency blockchain database may then become inconsistent, with multiple disparate versions stored across the computing systems in the open network.

The computing systems in an open network for a decentralized database may use a validation network to process amendments to the decentralized database. The validation network may be a network of a subset of the computing systems in the open network for the decentralized database. The validation network may determine the ordering of updates within an amendment to the decentralized database. The amendment, with the determined ordering of updates, may then be broadcast to the rest of the computing systems in the open network. The computing systems may then perform any necessary validation on the individual updates in the amendment before applying the amendment to the decentralized database. This may ensure that any non-faulty computing systems in the open network will store consistent copies of the decentralized database. For example, the validation network for a cryptocurrency blockchain database may gather transactions occurring using the cryptocurrency as the transactions are generated by computing systems in the open network for the cryptocurrency blockchain database and broadcast to the open network for validation. The transactions may be gathered into a block. The computing systems of the validation network may come to an agreement, for example, using any suitable consensus protocol, on the order in which the transactions gathered for the block occurred. Once consensus has been reached on the ordering of the transactions in the block, the block may be broadcast to the computing systems in the open network for the cryptocurrency blockchain database. The computing systems may validate each of the transactions in the block independently, discarding any invalid transactions, before applying, for example, appending, the block to the cryptocurrency blockchain database. Because each of the computing systems receives the same block with the same ordering of transactions, and because each non-faulty computing system may only validate transactions that are valid, the non-faulty computing systems in the open network may store consistent versions of the cryptocurrency blockchain database incorporating the new block.

A computing system may broadcast messages to other computing systems in the open network using a democratic reliable broadcast protocol. A democratic reliable broadcast protocol may ensure that any computing system that broadcasts a message to the open network broadcasts the same message to all computing systems in the open network, even when the broadcasting computing system is faulty. A message may be broadcast by the computing system to every computing system in the open network that listens for messages from the broadcasting computing system, which may be fewer than all of the computing systems in the open network. A computing system that receives a message from the initial computing system that broadcast the message may broadcast an echo of the message to the other computing systems in the open network which listen to the echoing computing system if that computing system has not yet echoed the message or another message. The computing system may then wait until it receives weak support from the open network for its echoing of the message Weak support for the echoing of the message may be received when the computing system receives the message echoed back to it from some number of other computing systems in the open network. For example, weak support may be received when the computing system receives an echo of the message from $t_S+1$ computing systems that may be members of any essential subset S, where S may be one of the essential subsets in a set of essential subsets for the computing system, and $t_S$ may be a configurable parameter specifying the number of acceptable faulty computing systems that can be in the essential subset S while still allowing the computing system to safely use the essential subset S. An essential subset for a computing system may include other computing systems designated by that computing system, for example, based on trust between the computing system and the other computing systems. A computing system may have any number of essential subsets, and the computing systems in different essential subsets may overlap, or in some cases, be identical. The essential subset S may also include a configurable parameter $q_S$, which may indicate the number of non-faulty, or correct, computing systems that need to be in the essential subset, for example, a quorum number for the essential subset. For any essential subset S, $t_S$ and $q_S$ may need to satisfy the inequalities:

$$0 \leq t_S, q_S \leq n_S \quad (1)$$

$$t_S < 2q_S - n_S \quad (2)$$

$$2t_S < q_S \quad (3)$$

where nS=|S|, the number of computing systems in the essential subset S.

Once a computing system that echoed the message that includes the proposed change receives weak support for the echoing of the message, the computing system may again broadcast an echo of the message to the other computing systems in the open network which listen to the echoing computing system if the computing system has not echoed the message or any other message. The computing system may then wait until it receives strong support from the open network for its echoing of the message.

Strong support for the echoing of the message may be received when the computing system receives the message echoed back to it from some number of other computing systems in the open network. For example, strong support may be received when the computing system receives an echo of the message from qS computing systems that are members of an essential subset S for each essential subset S used by the computing system. For example, if the computing system uses three essential subsets X, Y, and Z, strong support may be received when the message is echoed back from $q_X$ computing systems that are members of X, $q_Y$ computing systems that are members of Y, and $q_Z$ computing systems that are members of Z. After strong support for the echoing of the message is received by the computing system, the computing system may broadcast the message with a ready indicator if the computing system has not already broadcast the message or any other message with the ready indicator. The computing system may then wait until it receives weak support for the message with the ready indicator.

Weak support for the broadcast of the message with the ready indicator may be received when the computing system receives the message and a ready indicator broadcast to it from some number of other computing systems in the open network. For example, weak support may be received when the computing system receives the message with a ready indicator from $t_S+1$ computing systems that may be members of any essential subset S used by the computing system.

Once a computing system receives weak support for the broadcast of the message with the ready indicator, the computing system may again broadcast the message with the ready indicator to the other computing systems in the open network which listen to the computing system if the computing system has not already broadcast the message or any other message with the ready indicator. The computing system may then wait until it receives strong support from the open network for its broadcast of the message with the ready indicator.

Strong support for the broadcast of the message with the ready indicator may be received when the computing system receives the message echoed back to it from some number of other computing systems in the open network. For example, strong support may be received when the computing system receives the message with a ready indicator from $q_S$ computing systems that are members of an essential subset S for each essential subset S used by the computing system. For example, if the computing system uses three essential subsets X, Y, and Z, strong support may be received when the message is received with a ready indicator from $q_X$ computing systems that are members of X, $q_Y$ computing systems that are members of Y, and $q_Z$ computing systems that are members of Z. After strong support for the message with the ready indicator is received by the computing system, the computing system may accept the message. This may indicate that the message received by the computing system is the same message that was received by other computing systems in the open network from the computing system that initially the broadcast the message. In this way, any non-faulty computing system in the open network that were not blocked from receiving the broadcast of the message may accept the message including the proposed change and may be assured that every other non-faulty computing system in the open network also accepted the same message including the same proposed change. A computing system may be blocked, for example, by non-functional or poorly functioning communication links between computing systems in the open network.

Computing systems in an open network may generate amendments to the decentralized database, for example, validating blocks to be added to a blockchain. The amendments may have increasing sequence numbers which may describe the order in which an amendment is to be applied to the decentralized database. For example, the sequence number of a block may indicate where the block belongs in a totally ordered blockchain. When the computing systems in a validation network for an open network agree on an amendment B with a sequence number $n_B$ the computing systems may each broadcast an initialize indication, the amendment B, and the sequence number $n_B$ to the computing systems in the open network.

A computing system in the open network that is not part of the validation network may avoid broadcasting any messages that pertain to a sequence number n unless n is greater than or equal to a minimum sequence number min(v) and until an amendment has been accepted for every sequence number n' that is greater than or equal to min(v) and less than the n. The computing system may, upon receiving the initialize indication with the amendment B and the sequence number $n_B$ from t(v)+1 of the computing systems in the validation network, broadcast an echo indication with the amendment B and the sequence number $n_B$ to the open network. t(v) may be a threshold for tolerated faulty computing systems in the validation network.

Upon receiving weak support for the echo indication and with the amendment B and the sequence number $n_B$, the computing system may broadcast an echo indication with the amendment B and the sequence number $n_B$ if it has not already broadcast an echo indication with any amendment and the sequence number $n_B$.

Upon receiving strong support for the echo indication and with the amendment B and the sequence number $n_B$, the computing system may broadcast a ready indication with the amendment B and the sequence number $n_B$ if it has not already broadcast a ready indication with any amendment and the sequence number $n_B$.

Upon receiving weak support for the ready indication and with the amendment B and the sequence number $n_B$, the computing system may broadcast the ready indication with the amendment B and the sequence number $n_B$ if it has not already broadcast a ready indication with any amendment and the sequence number $n_B$.

Upon receiving strong support for the ready indication and with the amendment B and the sequence number $n_B$, the computing system may broadcast a check indication with the amendment B and the sequence number $n_B$ if it has not already broadcast a check indication with any amendment and the sequence number $n_B$ and if a Boolean variable lock for the current validation network is set to false.

Upon receiving strong support for the check indication and with the amendment B and the sequence number $n_B$, the computing system may accept the amendment B for the sequence number $n_B$. The computing system may apply the amendment B to the decentralized database. For example, the amendment B may be a block, including ordered transactions, for a blockchain. The computing system may apply the block to the blockchain at a location in the blockchain indicated by the sequence number $n_B$.

The subset of the computing systems in the open network used in the validation network may be changed by the computing systems in the open network. A computing system in the open network may request that the subset of the computing systems used in the validation network be changed, for example, when the computing system detects an issue with the current validation network. For example, a computing system may determine that the current validation network is failing. The computing system may broadcast a change indication with a proposed validation network to the computing systems in the open network. The proposed validation network may be, for example, a subset of computing systems in the open network that has been previously agreed upon as a possible validation network by the computing systems of the open network.

Upon receiving strong support for the change indication with the proposed validation network, the computing system may broadcast a confirm indication with the proposed validation network. Strong support for the change indication may be received when the computing system receives the change indication with the proposed validation network back from some number of other computing systems in the open network. For example, strong support may be received when the computing system receives a change indication with the proposed validation network from $q_S$ computing systems that are members of an essential subset S for each essential subset S used by the computing system. For example, if the computing system uses three essential subsets X, Y, and Z, strong support may be received when the change indication with the proposed validation network is received back from $q_X$ computing systems that are members of X, $q_Y$ computing systems that are members of Y, and $q_Z$ computing systems that are members of Z. An essential subset for a computing system may include other computing systems designated by that computing system, for example, based on trust between the computing system and the other computing systems. A computing system may have any number of essential subsets, and the computing systems in different essential subsets may overlap, or in some cases, be identical. An essential subset S may also include a configurable parameter $q_S$, which may indicate the number of non-faulty, or correct, computing systems that need to be in the essential subset.

Upon receiving weak support for the confirm indication with the proposed validation network, the computing system may broadcast the confirm indication with the proposed validation network if the computing system has not yet broadcast the confirm indication with the proposed validation network. Weak support for the confirmation indication with the proposed validation network may be received when the computing system receives a confirm indication with the proposed validation network back from some number of other computing systems in the open network. For example, weak support may be received when the computing system receives an the confirm indication with the proposed change from $t_S$+1 computing systems that may be members of any essential subset S, where S may be one of the essential subsets in a set of essential subsets for the computing system, and $t_S$ may be a configurable parameter specifying the number of acceptable faulty computing systems that can be in the essential subset S while still allowing the computing system to safely use the essential subset S.

Upon receiving strong support for the confirm indication with the proposed change, the computing system may set the Boolean variable lock to true for the current validation network. This may prevent computing systems in the open network from making any amendments to their copy of the decentralized database while the change in validation networks is in progress. The computing system may then broadcast a lock indication with the proposed validation network and the highest sequence number of an amendment, such as, for example, a block for a blockchain, that the open network has accepted from the current validation network that will be replaced with the proposed validation network.

The computing system may wait until, for each essential subset used by the computing system, the computing system receives a lock indication with the proposed validation network and a sequence number from every computing system in a subset of the essential subset, where the subset of the essential subset includes as many or more than $q_S$ computing systems, and where if the computing system receives the lock indication with the proposed validation network and any sequence number from any computing system in the subset of the essential subset, then the computing system has also received strong support for a ready indication with that sequence number. A value for a locked sequence number may be set to the highest sequence number received along with the lock indication and the proposed validation network from any of the computing systems in the subsets of the essential subsets.

If the computing system is one of the computing systems that is in the proposed validation network, the computing system may use external validity multi-valued Byzantine agreement to generate a consensus among the computing systems in the proposed validation network on a continuing sequence number that is greater than the locked sequence number and for which the computing system has previously received strong support for ready indication that includes a sequence number that is 1 less than the continuing sequence number for some amendment B that was broadcast by the current validation network that is being replaced by the proposed validation network, The computing system that is in the proposed validation network may, after an agreement on the values of the continuing sequence number has been reached through external multi-valued Byzantine agreement, broadcast a new view indication including the proposed validation network and the continuing sequence number.

Upon receiving a new view indication with the proposed validation network and the continuing sequence number from $t(v')+1$ of the computing systems in the proposed validation network where $t(v')$ may be a threshold for tolerated faulty computing systems in the proposed validation network. If the continuing sequence number is greater than the locked sequence number and strong support has been received for the ready indication with some amendment B, the current validation network, and a sequence number that is 1 less than the continuing sequence number, the computing system may broadcast an echo indication with the proposed validation network and the continuing sequence number if it has not already broadcast an echo indication with the proposed validation network and any sequence number.

Upon receiving weak support for the echo indication with the proposed validation network and the continuing sequence number, the computing system may broadcast the echo indication with the proposed validation network and the continuing sequence number if it has not already broadcast an echo indication with the proposed validation network and any sequence number.

Upon receiving strong support for the echo indication with the proposed validation network and the continuing sequence number, the computing system may broadcast the ready indication with the proposed validation network and the continuing sequence number if it has not already broadcast a ready indication with the proposed validation network and any sequence number.

Upon receiving strong support for the ready indication with the proposed validation network and the continuing sequence number, the computing system may wait until for every sequence number less than the continuing sequence number, it has received strong support for a ready indication including that sequence number, some amendment B, and the current validation network and has accepted the amendment B with that sequence number. The computing system may then switch to the proposed validation network and set a minimum sequence number for the proposed validation network to the continuing sequence number.

External validity multi-valued Byzantine agreement may be used by computing systems to reach consensus, such as, for example, consensus on a value of a variable included in a message that has been accepted by the computing systems. The variable may be, for example, the next sequence number to be used for an amendment to a decentralized database, such as a block in a blockchain database. MVBA may be used to by computing systems to come to consensus on the value of that next sequence number. Each message including a value that is broadcast may also include a slot number. The slot number may be used to order various values that may be broadcast, so that they may be considered in order by the computing systems that receive the broadcast. Multiple messages may include the same slot number. The values from messages that include the same slot number may be stored as a set of values from which one of the values may be ratified, resulting in consensus.

The values stored on a computing system for a given slot may start empty. Once a message including a slot number and a value is received and accepted by the computing system, the value may be added to the set of values for that slot number. The value may be, for example, a proposed sequence number for the continuing sequence number. Subsequent messages that include the same slot number that are received and accepted may have their included values added to the set of values for that slot number. Messages may include slot numbers that are ahead of the current slot for which a value has been ratified. For example, a message may be broadcast including the slot number 5 before any value that was included with a message that included the slot number 2 has been ratified. A computing system may not consider any values included in a message that includes a particular slot number until a value included in a message that included lower slot numbers has been ratified for all slot numbers that precede the particular slot number. For example, the value included in the message that includes the slot number 5 may not be considered until a value has been ratified for slot numbers 0, 1, 2, 3 and 4.

Once a value is stored in the set of values for the current slot number, and values have been ratified for all preceding slot numbers if this is not the first slot, the computing system may broadcast an election indication with the value and a round number to the network of systems participating in the MVBA, which may be, for example, all of the computing systems in an open network, or only the computing systems in a proposed validation network for an open network. The round number may initially be 0 when the computing system broadcasts the election indication for the first time for the current slot number. The computing system may wait until, for every essential subset of computing systems used by the computing system, there is a subset of computing systems within the essential subset that includes $q_S$ or more computing systems from which an election indication for the current round number has been received, and if any of the values received at the computing system with the election indications differ from the value broadcast by the computing system, then those values are already stored in the set of values. Once these conditions are fulfilled, the computing system may determine if the set of values only includes, as a single element, the value that the computing system broadcast with the election indication. If so, the computing system may broadcast the value and round number with a finish indication. Otherwise, the computing system may broadcast the entire set of values and round number with a continue indication.

If the computing system broadcast the finish indication with the value and the round number, the computing system may wait until it receives strong support for the finish indication with the value and the round number. Upon receiving strong support for the finish indication with the value and the round number, the computing system may vote 1 in an asynchronous binary Byzantine agreement instance that is tagged with a stop message and the round number.

If, instead of receiving strong support for the finish indication, the computing system receives a continue indication including a set of values whose elements are two or more values and that is a subset of the set of values on the computing system, the computing system may broadcast a continue indication with the set of values and the round number, and vote 0 in the asynchronous binary Byzantine agreement instance that is tagged with a stop message and the round number.

To vote in an asynchronous binary Byzantine agreement instance for a round of external validity multi-valued Byzantine agreement, a computing system may set an estimate value for the current round of asynchronous binary Byzantine agreement to the computing system's vote, which may be 0 or 1. A set of binary values may be set to empty, and the round number for the asynchronous binary Byzantine agreement instance may be set to 0. The computing system may then broadcast an initialize indication with the estimate value and the round number. The instance of asynchronous binary Byzantine agreement may be tagged with a stop message and a round number for the round of external validity multi-valued Byzantine agreement that the instance of asynchronous binary Byzantine agreement is part of.

The computing system may, upon receiving weak support for the initialization indication with the round number and a binary value of either a 0 or 1, broadcast an initialization indication with the round number and the value, either 0 or 1, for which weak support was received.

The computing system may, upon receiving strong support for the initialization indication with the round number and a binary value of either a 0 or 1, add the binary value to the set of binary values. The computing system may then broadcast an auxiliary indication with the binary value and the round number.

The computing system may wait until, for each essential subset used by the computing system, there is a subset of computing systems in that essential subset with $q_S$ or more computing systems from which the computing system has received an auxiliary indication with the round number and a binary value which has already been made an element of the set of binary values. The binary values received with the auxiliary indications from different computing systems within a subset of computing systems in an essential subset may differ.

The computing system may query a random oracle. The random oracle may return a value from the sample space that includes the binary values 0 and 1. The random oracle may return 0 with 50% probability and 1 with 50% probability upon being queried. The binary value returned to the computing system by the random oracle may be stored by the computing system as a random oracle value.

The computing system may determine if the set of binary values includes 2 values, for example, both 0 and 1, and if so, may set an estimate value for the next round to the random oracle value. Otherwise, if the set of binary values includes only one of the binary values, the estimate value for the next round may be set to that binary value. If the one binary value included in the set of values is the same binary value as the random oracle value, the computing system may broadcast a finish indication including the random oracle value. The computing system may then increase the round number, for example, by 1 to indicate a next round, and broadcast an initialization indication with the estimate value, which may have been updated, or may be the same as the previously broadcast estimate value. The computing system may then begin repeating the steps taken after the broadcast of the initialization indication.

The computing system may, while repeating the steps of asynchronous binary Byzantine agreement, wait to receive weak support or strong support for a finish indication with either of the binary values, 0 or 1. Upon receiving weak support for a finish indication for one of the binary values, the computing system may broadcast a finish indication with that binary value. Upon receiving strong support for a finish indication with either of the binary values, 0 or 1, the computing system may output the binary value received with the finish indication for which strong support was received and terminate the instance of asynchronous binary Byzantine agreement running on the computing system.

After voting in the instance of asynchronous binary Byzantine agreement tagged with the stop message and round number for the current round of external validity multi-valued Byzantine agreement, a computing system may wait until the instance of asynchronous binary Byzantine agreement terminates. On termination, the instance of asynchronous binary Byzantine agreement may output a value of 0 or 1.

If the output value from the instance of asynchronous binary Byzantine agreement on termination is 1, the computing system may wait until weak support is received for a finish indication with the value that was voted on using asynchronous binary Byzantine agreement and the current round number. After receiving weak support, the computing system may broadcast a finish indication with the value and current round number. The computing system may then wait to receive strong support for a finish indication including a value that is in the set of values stored by the computing system and the current round number. Upon receiving strong support, the external validity multi-valued Byzantine agreement on the computing system may terminate and output the value included with the finish indication for which strong support was received. This value may then be used by the computing system, for example, as the next sequence number to be used for an amendment, such as a block, for a decentralized database, such as a blockchain, after a proposed validation network replaces a current validation network for an open network.

If the output value from the instance of asynchronous binary Byzantine agreement on termination is 0, the computing system may wait until the computing system receives a continue indication including a set of values whose elements are two or more values and that is a subset of the set of values on the computing system. The computing system may then broadcast a continue indication with the set of values stored on the computing system and the current round number. If the set of values stored on the computing systems is updated by having proposed changes added to it, then the computing system may broadcast a continue indication with the updated set of values and the current round number. The computing system may wait until, for every essential subset used by the computing system, there is some subset of the set of values for which strong support for a continuation indication with the subset of values and the current round number has been received. The computing system may then query a random oracle that may return a value from the uniform space of integers modulo a selected large number, such as, for example, $2^{128}$. The value returned by the random oracle may be concatenated to the end of each value in the set of values, and each result of concatenation may be hashed using a collision resistant hash function. An estimate value for the next round may be set to the value that results in the lowest hash value among all values in the set of values. The computing system may broadcast an initialization indication with the estimate value for the next round and the next round number.

The computing system may then wait to receive weak support for an initialization indication with any value and the next round number, or to add a value that, when concatenated with the random oracle value, has hash value less than the hash value of the estimate value concatenated with the random oracle value, to the set of values. The computing system may then broadcast an initialization indication with the value for which weak support was received, or which was added to the set of values, and the next round number.

The computing system may, upon receiving strong support for the initialization indication with the value for which weak support was received, or which was added to the set of values, and the next round number, add the value to a set of values for the next round number, increment the round number, and return to broadcasting an election indication to perform the next round of external validity multi-valued Byzantine agreement.

The random oracle used during external validity multi-valued Byzantine agreement may be implemented in the open network. A computing system $P_i$ in the open network may be uncorrupt and weakly connected. The computing system $P_i$ may be weakly connected when it is linked to every computing system in an extended unique node list for the computing system $P_i$. The unique node list for the computing system $P_i$ may be the union of every essential subset in the set of essential subset for the computing system $P_i$. The extended unique node list for the computing system $P_i$ may be the smallest set containing the computing system $P_i$ such that for every honest computing system on the extended unique node list for the computing system $P_i$, the unique node list for that computing system is a subset of the extended unique node list for the for the computing system $P_i$. The computing system $P_i$ may be linked to another computing system $P_j$ when the computing system $P_i$ and the computing system $P_j$ have an essential subset in common and $q_s$ computing systems in that essential subset are correct. A computing system may considered correct when it is not Byzantine, for example, does not behave arbitrarily and not according to protocol. A computing system may be considered uncorrupt if fewer than $q_s$ computing systems in every essential subset of the set of essential subsets for the computing system are faulty or Byzantine.

A random oracle in an open network over a sample space may be a black box that, when queried by two linked honest computing systems, gives those systems the same value, and if the random oracle returns a value s to a weakly connected, uncorrupt, honest computing system $P_i$, then there is some honest computing system $P_j$ on the unique node list for the computing system $P_i$ such that s is random value sampled from the sample space and independent of the state of the computing system $P_j$ at the time the random oracle is queried by the computing system $P_j$.

The weakly connected, uncorrupt computing system $P_i$ in the open network may choose a random secret s. The computing system $P_i$ may use an asynchronous verifiable secret sharing scheme to distribute $q_s$-threshold shares of the secret s to each essential subset in the set of essential subsets of the computing system $P_i$. Because the computing system $P_i$ may be uncorrupt, the secret s cannot be reconstructed without some honest computing system from the unique node list of the computing system $P_i$ revealing the share of the secret s it received from the computing system $P_i$.

Because the computing system $P_i$ may be weakly connected, if every honest computing system in the extended unique node list for the computing system $P_i$ reveals its shared of the secrets, then every unblocked computing system in the extended unique node list for the computing system $P_i$ may be able to reconstruct the secret s.

If several computing systems in the open network distribute secrets in the same manner as the computing system $P_i$, the sum of these secrets may be perfectly random as long as single secret is perfectly random. The open network may use any suitable consensus mechanism to agree on a set of secrets, and any computing system in the open network may add a secret to the set of secrets by distributing shares of that secret using the asynchronous verifiable secret sharing scheme.

To create a random value, a deterministic seed message M may be created. Every computing system that has a share of any of the secrets in the set of secrets may sign the message M with that share, generating a signature share for the computing system. A computing system that wants to query the random oracle may reveal its signature share that was generated by the computing system using its secret share to sign the message M. The computing systems in the open network may combine the signatures on the message M after the message M has been signed over every secret in the set of secrets. The signatures may be, for example, cryptographic signature of any suitable type. The signatures may be combined in a deterministic manner, resulting in a common source of randomness for the open network that may be unpredictable as long as any of the secrets in the set of secrets are unknown in advance.

FIG. 1 shows an example system suitable for random oracles in open networks according to an implementation of the disclosed subject matter. A node computing device 100 may include an open network client 110 and a storage 140. The node computing device 100 may be any suitable computing device, such as, for example, a computer 20 as described in FIG. 12, or component thereof, for implementing the open network client 110 and the storage 140. The node computing device 100 may be a single computing device, or may include multiple connected computing devices, and may be, for example, a laptop, a desktop, an individual server, a server farm, or a distributed server system, or may be a virtual computing device or system. The node computing device 100 may be part of a computing system and network infrastructure or may be otherwise connected to the computing system and network infrastructure. The node computing device 100 may be, for example, a computing device or system that is used to connect to an open network that includes a decentralized database and that may be able to serve as part of a validation network for the open network. The open network client 110 may be any suitable combination of hardware and software on the node computing device 100 for interacting with an open network, including performing functions related to the decentralized database, which may be, for example, a blockchain database stored across multiple computing devices. The storage 140 may be any suitable combination of hardware and software for storing data, including any suitable volatile and non-volatile storage.

The open network client 110 may be any suitable combination of hardware and software on the node computing device 100 for interacting with an open network, including performing functions related to the decentralized database. The open network may be a network of node computing devices, such as the node computing device 100, which host the decentralized database. The open network client 110 may allow the node computing device 100 to send and receive messages in the open network, for example, to receive proposed and validated amendments to the decentralized database, participate in a validation network for the open network, and participate in voting for changes to the validation network for the open network. The open network client 110 may, for example, implement a democratic reliable broadcast protocol for sending and receiving messages from other node computing devices in the open network. The open network client 110 may allow the node computing device 110 to participate in external validity multi-valued Byzantine agreement and asynchronous binary Byzantine agreement with other node computing devices in the open network. The open network client 110 may maintain a unique node list, an extended unique node list, and essential subsets for the node computing device 100. The open network client 110 may also maintain shares of secrets distributed by other node computing devices in the open network to be used when a random oracle is queried by a node computing device of the open network.

The decentralized database of the open network may be a blockchain database. The open network client 110 may allow for the node computing device 100 to interact with, and be a part of, the decentralized database. For example, the open network client 110 may maintain a copy of the decentralized database in the storage 140 of the node computing device 100. The open network client 110 may allow the node computing device 100 to write blocks of the blockchain of the decentralized database after the blocks have been validated, for example, by a validation network for the open network.

The storage 140 may store a decentralized database copy 142. The decentralized database copy 142 may be, for example, a copy of the blockchain of the decentralized database, which may be stored in the form of decentralized database copies on the node computing devices of the open network. The decentralized database copy 142 may be stored as, for example, a series of blocks, and may be append only. The decentralized database copy 142, as stored on the node computing device 100, may be a complete copy of the blockchain of the decentralized database including all blocks written to the blockchain since its inception. Amendments to the decentralized database may be in the form of blocks which may be validated, for example, by a validation network for the open network, and added to the decentralized database copy 142 by the open network client 110 on the node computing device 100. Each node computing device in the open network may maintain its own decentralized database copy.

Figure 2:
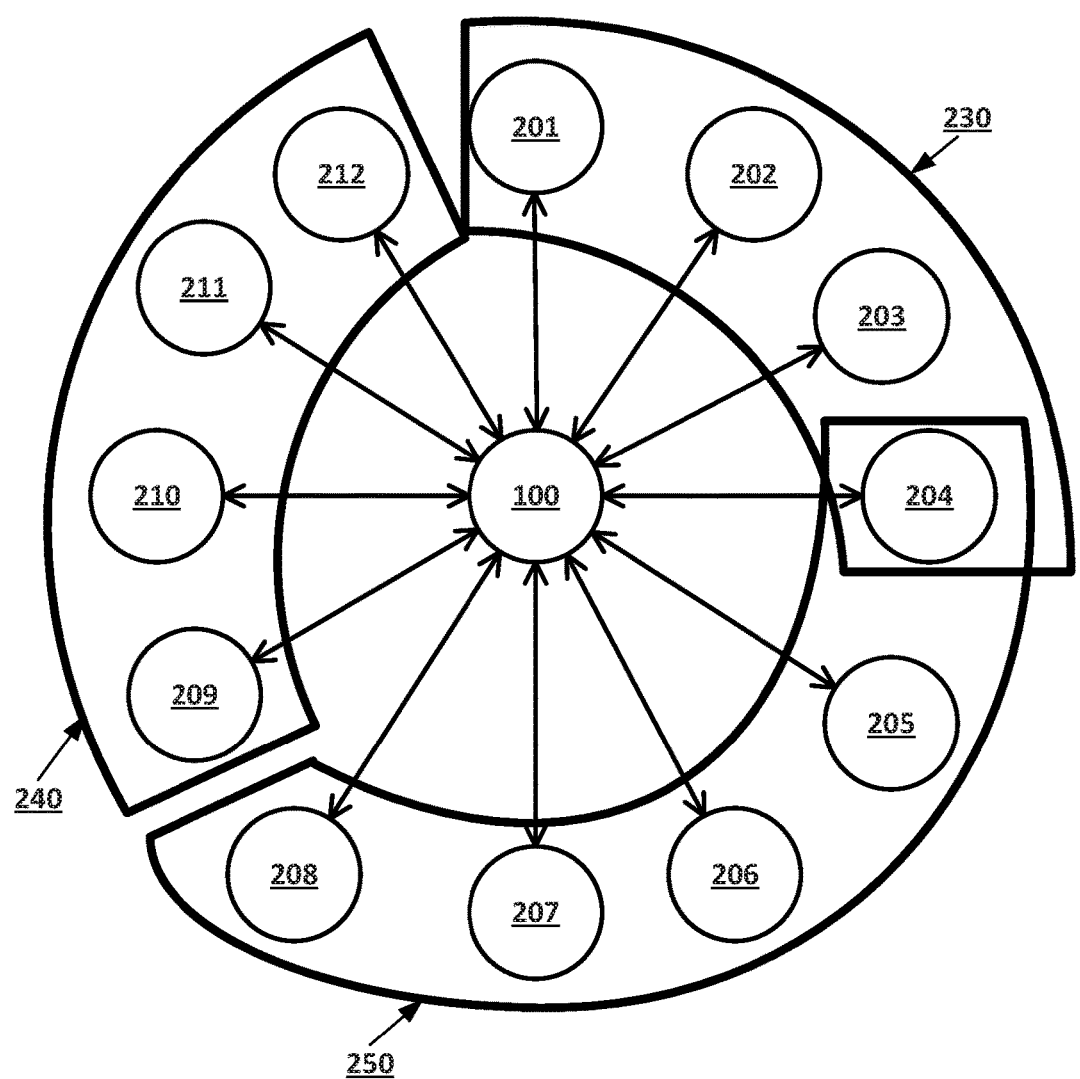
FIG. 2 shows an example arrangement suitable for random oracles in open networks according to an implementation of the disclosed subject matter.

FIG. 2 shows an example system suitable for random oracles in open networks according to an implementation of the disclosed subject matter. An open network may include any number of node computing devices. The node computing device 100 may maintain a unique node list (UNL), which may include node computing devices which the node computing device 100 partially trusts and listens to and are part of the open network. For example, the UNL of the node computing device 100 may be $UNL_i$ and may include the node computing devices 201, 202, 203, 204, 205, 206, 207, 208, 209, 210, 211, and 212.

The open network client 110 of the node computing device 100 may maintain a set of essential subsets $ES_i$ for the node computing device 100, such that $UNL_i = \cup_{E \in ES_i} E$, where E may be an essential subset. Each essential subset may include some number of node computing devices from the UNL for the node computing device 100, and the same node computing device may be in more than on essential subset. For example, the set of essential subsets for the node computing device 100 may have three essential subsets, the essentials subsets 230, 240, and 250. The essential subset 230 may include the node computing devices 201, 202, 203, and 204. The essential subset 240 may include the node computing devices 209, 210, 211, and 212. The essential subset 250 may include the node computing devices 204, 205, 206, 207, and 208. For each essential subset $S \in ES_i$, $n_s = |S|$, and parameters $t_s$ and $q_s$ may be defined, for example, by the open network client 110. $t_S$ and $q_S$ may be defined such that $0 \leq t_S$, $q_S \leq n_S$, $t_S \leq 2q_S - n_S$, and $2t_S < q_S$. For example, for the essential subset 230, n=4, t may be set to 1 and q may be set to 3. For the essential subset 250, n=5, t may be set to 1, and q may be set to 4. $t_s$ may represent the maximum allowed number of actively Byzantine node computing devices in an essential subset S for guaranteeing safety while $q_S$ may represent the number of correct node computing devices S for guaranteeing liveness.

Figure 3:
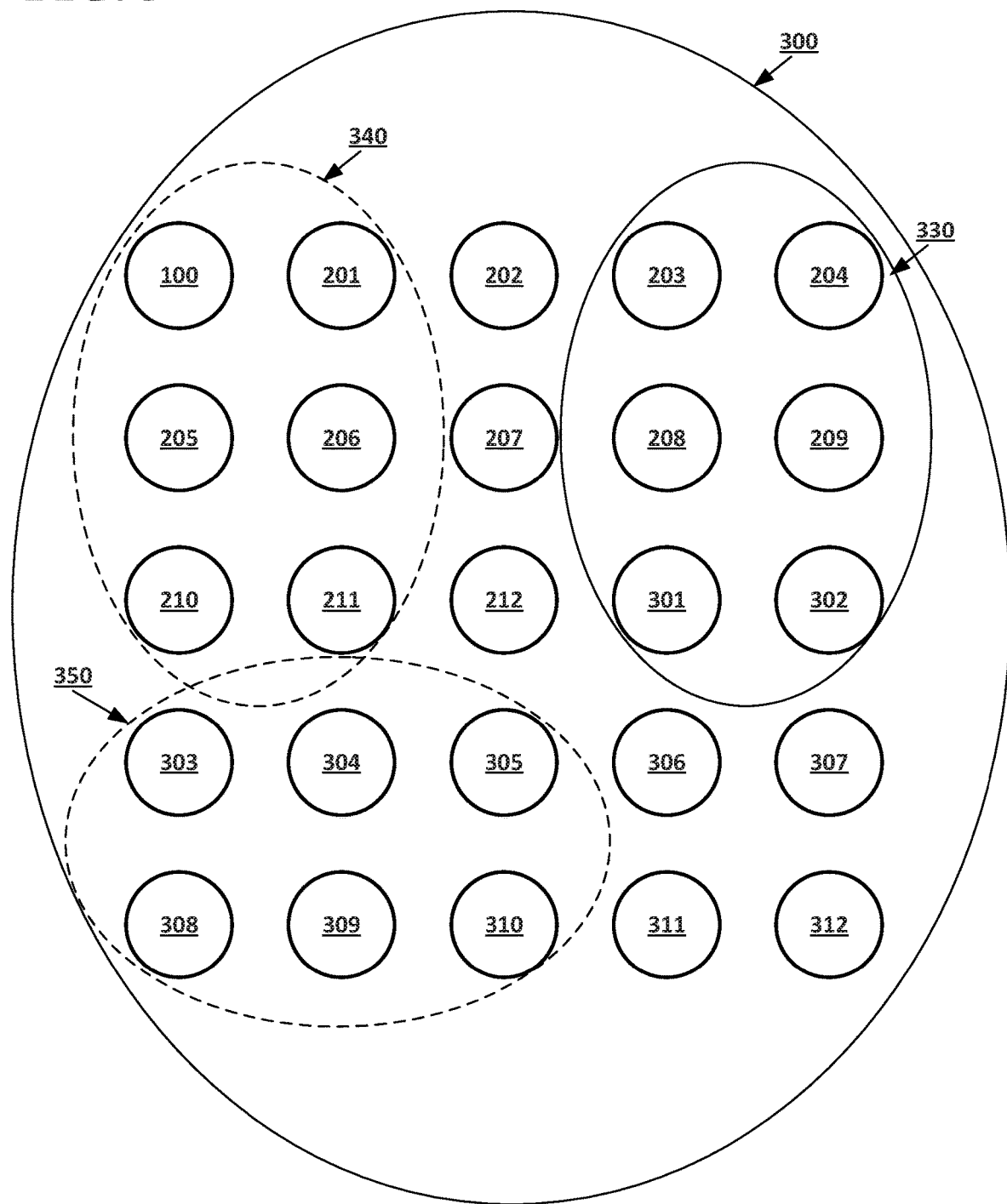
FIG. 3 shows an example arrangement suitable for random oracles in open networks according to an implementation of the disclosed subject matter.

FIG. 3 shows an example system suitable for random oracles in open networks according to an implementation of the disclosed subject matter. An open network 300 for a decentralize database may include a number of node computing devices, such as, for example, the node computing devices 100, 201, 202, 203, 204, 205, 206, 207, 208, 209, 210, 211, 301, 302, 303, 304, 305, 306, 307, 308, 309, 310, 311, and 312. Node computing devices may join, leave, and rejoin, the open network 300 at any time. Amendments to the decentralized database of the open network 300 may be validated using a validation network that includes node computing devices of the open network 300. For example, a validation network 330 may be the current validation network v for the open network 300. The validation network 330 may include the node computing devices 203, 204, 209, 209, 301, and 302. The validation network 330, while it is the current validation network, may be responsible for validating amendments to the decentralized database which may then be applied by all of the node computing devices that are part of the open network 300 to their copy of the decentralized database.

Backup validation networks for when the current validation network v is detected to be failing may be determined in real time or may be defined in advance. For example, a validation network 340 may be a backup validation network $v_1$ defined in advance to include the node computing devices 100, 201, 205, 206, 210, and 211. A validation network 350 may be a backup validation network $v_2$ defined in advance to include the node computing devices 303, 304, 305, 308, 309, and 310.

Amendments to the decentralized database may be validated by the current validation network v, for example, the validation network 330. The amendments may be validated by any suitable consensus mechanism used among the node computing devices of the current validation network v. t(v) may be the threshold of tolerated faulty node computing devices in the current validation network v. lock(v) may be a Boolean variable for the current validation network v that initializes to fault upon v becoming the current validation network, for example, the validation network 330 was chosen to validate amendments to the open network 300. min(v) may be a positive integer constant which may be set to 0 if the validation network 330 is the first validation network for the open network 300, or otherwise may have been set to a value greater than zero when the validation network 330 became the current validation network v.

Figure 4:
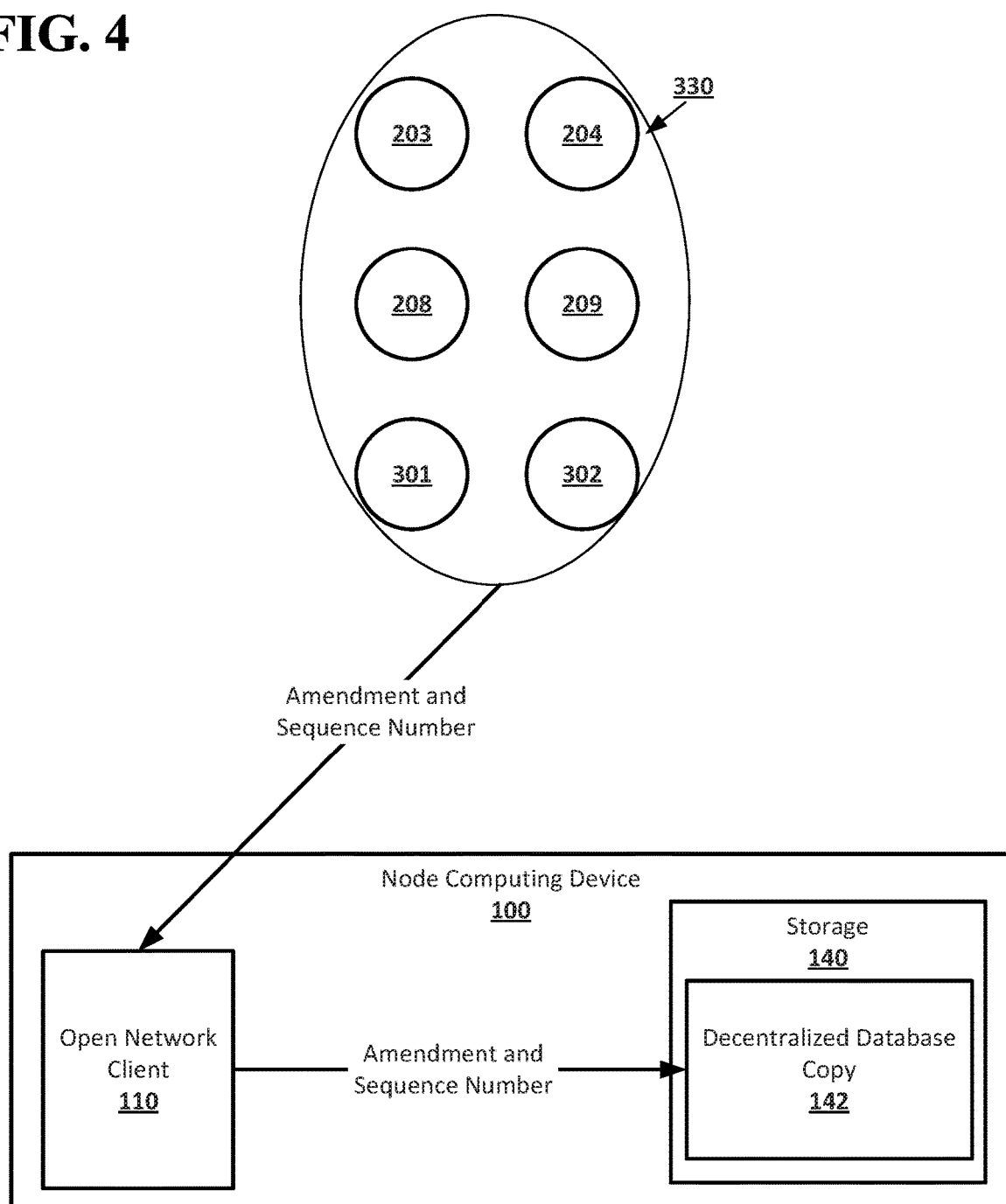
FIG. 4 shows an example arrangement suitable for random oracles in open networks according to an implementation of the disclosed subject matter.

FIG. 4 shows an example arrangement suitable for random oracles in open networks according to an implementation of the disclosed subject matter. Amendments validated by the current validation network v, for example, the validation network 330, may have increasing sequence numbers which may describe the ordering of the amendments. For example, each block validated for a blockchain may have a sequence number that is one greater than the previously validated block, allowing the blocks to be ordered in the blockchain. When the node computing devices in the current validation network v, for example, the validation network 330, agree on an amendment B with a sequence number $n_B$, the node computing devices in the current validation network v may broadcast INIT(B, $n_B$) to the open network 300, for example, using the open network clients running on the node computing devices node computing devices 203, 204, 209, 209, 301, and 302.

Each node computing in the open network 300 may run an amendment acceptance protocol to determine whether to accept an amendment validated and broadcasted by the current validation network v, for example, the validation network 330. The amendment acceptance protocol may be executed by the open network client, for example, the open network client 110 on the node computing device 100. The amendment acceptance protocol for a node computing device P of the open network 300 for an amendment B, where (_) may represent any value, may be:
1. Do not broadcast any messages pertaining to a sequence number n unless n≥min(v) and until $P_i$ has accepted an amendment for every sequence number n' such that min(v) ≤n' and n'<n.
2. Upon receiving INIT(B, $n_B$, v) from t(v)+1 of the node computing devices in the current validation network v, broadcast ECHO(B, $n_B$, v) if $P_i$ has not already broadcast ECHO(_, $n_B$, v).
3. Upon receiving weak support for ECHO(B, $n_B$, v), broadcast ECHO(B, $n_B$, v) if $P_i$ has not already broadcast ECHO(_, $n_B$, v).
4. Upon receiving strong support for ECHO(B, $n_B$, v), broadcast READY(B, $n_B$, v) if $P_i$ has not already broadcast READY(_, $n_B$, v).
5. Upon receiving weak support for READY(B, $n_B$, v), broadcast READY(B, $n_B$, v) if $P_i$ has not already broadcast READY(_, $n_B$, v).
6. Upon receiving strong support for READY(B, $n_B$, v), broadcast CHECK(B, $n_B$, v) if lock(v) is false and $P_i$ has not already broadcast CHECK(_, $n_B$, v).
7. Upon receiving strong support for CHECK(B, $n_B$, v), accept the amendment B with the sequence number $n_B$ Accepting the amendment B may result in, for example, the open network client 110 adding the amendment B to the decentralized database copy 142 with the sequence number $n_B$ on the node computing device 100. For example, the amendment B is a block that may be appended to the end of the blockchain of the decentralize database copy 142 so that is succeeds a previous block with lower sequence number than $n_B$.

Every node computing device in the open network 300 may open a reliable authenticated channel that may allow every node computing device of the current validation network v, for example, the validation network 300, to broadcast to it. As long as the current validation network has not critically failed, every node computing device in the open network 300 will eventually accept every amendment to the decentralized database processed by the current validation network. If any node computing device in the open network 300 accepts an amendment from the current validation network, then every node computing device in open network 300 will eventually accept that amendment to the decentralized database, and no two node computing devices will accept amendments that are inconsistent. This may allow the copies of the decentralized database maintained on node computing devices of the open network 300 to remain consistent regardless of the states of the validation network.

Figure 5:
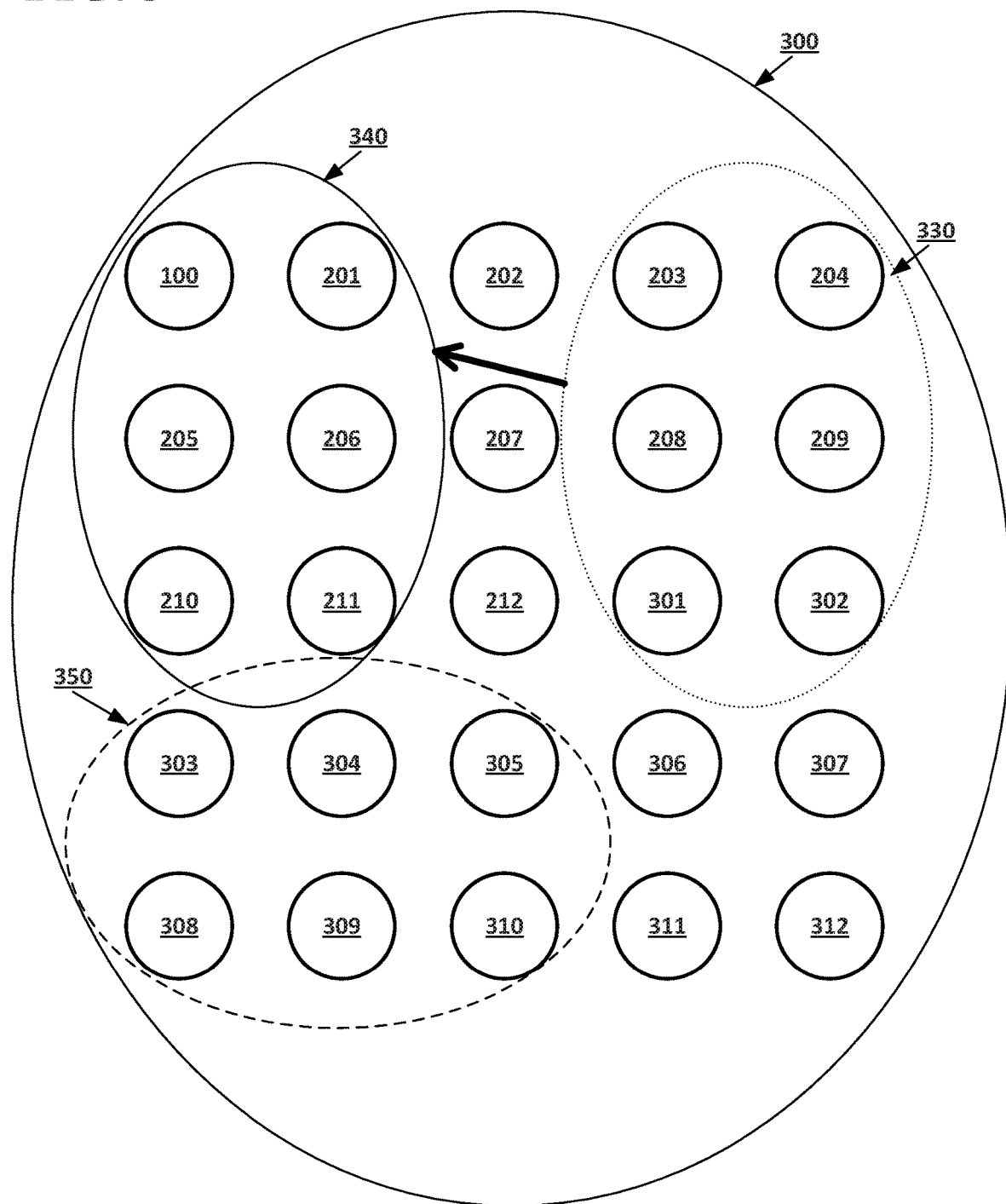
FIG. 5 shows an example arrangement suitable for random oracles in open networks according to an implementation of the disclosed subject matter.

FIG. 5 shows an example arrangement suitable for random oracles in open networks according to an implementation of the disclosed subject matter. A validation network change protocol may be implemented by open network clients, such as the open network client 100. The validation network change protocol may be used to change from the current validation network to another validation network. The validation network change protocol may also allow node computing devices to come to agreement on the most recently accepted amendment to the decentralized database. The validation network change protocol may be started by the open network client, for example, the open network client 110 on the node computing device 100, for any suitable reason. For example, a node computing device may determine that the current validation network has failed due to receiving different amendments with the same sequence number from enough node computing devices of the current validation network to determine that the number of nodes in the current validation network that are Byzantine exceeds t(v). For example, if t(v)=2, the current validation network has six node computing devices, and a node computing device in the open network 300 and not in the current validation network receives an amendment B with sequence number n from three node computing devices in the current validation network v and an amendment C with sequence number n from the remaining three node computing devices in the current validation network, the node computing device may determine that current validation network has three Byzantine nodes, and has therefore failed.

Figure 6:
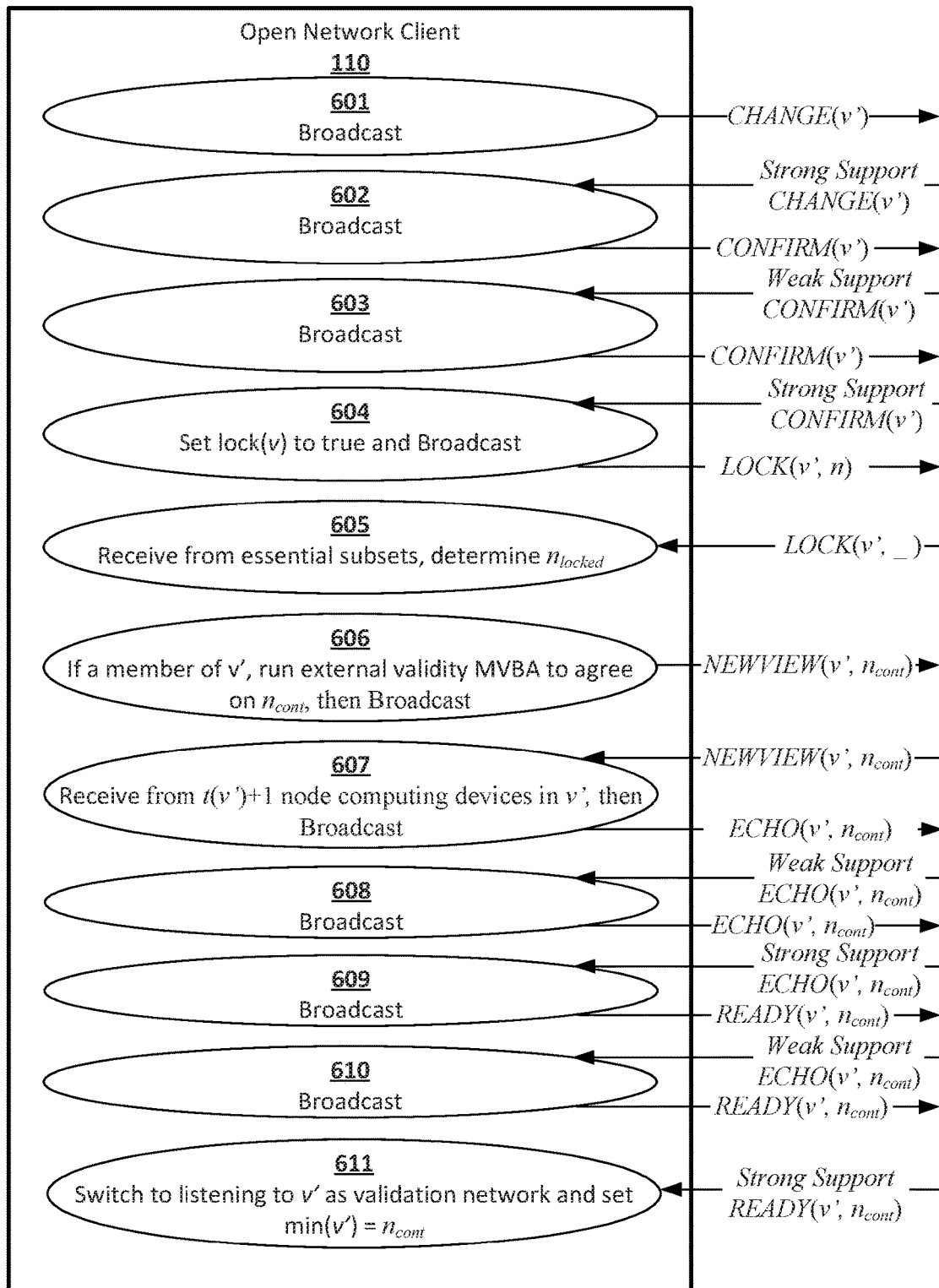
FIG. 6 shows an example arrangement suitable for random oracles in open networks according to an implementation of the disclosed subject matter.

FIG. 6 shows an example arrangement suitable for random oracles in open networks according to an implementation of the disclosed subject matter. To request a view change from a current validation network v, for example, the validation network 330, to the next validation network v', for example, the validation network 340, a node computing device $P_i$ of the open network 300 may run the validation network change protocol, for example using an open network client such as the open network client 110, which may be:
1. Broadcast CHANGE(v') where v' is the next validation network. (601)
2. Upon receiving strong support for CHANGE(v'), broadcast CONFIRM(v) if $P_i$ has not already broadcast CONFIRM(v'). (602)
3. Upon receiving weak support for CONFIRM(v'), broadcast CONFIRM(v') if $P_i$ has not already broadcast CONFIRM(v'). (603)
4. Upon receiving strong support for CONFIRM(v'), set lock(v) to true and broadcast LOCK(v', n) wherein n is the highest sequence number of any amendment accepted by $P_i$ from v. (604)
5. Wait until, for every essential subset S∈$ES_i$ for $P_i$, $P_i$ has received LOCK(v', _) from every node computing device in some subset T⊆S with |T|=$q_s$, such that if $P_i$ has received LOCK(v', n) for any n from any node computing device in T, then $P_i$ has received strong support for READY(_, n). $n_{locked}$ may be the maximum sequence number present in any of the LOCK(v', _) messages received by $P_i$ from a node computing device in one of the T sets. (605)
6. If $P_i$ is a member of v', then $P_i$ runs an external validity MVBA to agree on a sequence number $n_{cont}$ which is greater than $n_{locked}$ but for which $P_i$ has received strong support for READY(B, $n_{cont}-1$, v) for some amendment B. After completion of external validity MVBA, $P_i$ then broadcasts NEWVIEW(v', $n_{cont}$). (606)

7. Upon receiving NEWVIEW(v', $n_{cont}$) from t(v')+1 node computing devices in v' where t(v') may be the threshold of tolerated faulty node computing devices in v', if $n_{cont}$ is greater than $n_{locked}$ and $P_i$ has received strong support for READY(B, $n_{cont}-1$, v) for some amendment B, then broadcast ECHO(v', $n_{cont}$) if $P_i$ has not already broadcast ECHO (v', _). (607)

8. Upon receiving weak support for ECHO(v', $n_{cont}$), broadcast ECHO(v', $n_{cont}$) if $P_i$ has not already broadcast ECHO (v', _). (608)

9. Upon receiving strong support for ECHO(v', $n_{cont}$), broadcast READY(v', $n_{cont}$) if $P_i$ has not already broadcast READY(v', _). (609)

10. Upon receiving weak support for READY(v', $n_{cont}$), broadcast READY(v', $n_{cont}$) if $P_i$ has not already broadcast READY(v', _). (610)

11. Upon receiving strong support for READY(v', $n_{cont}$), for every $n<n_{cont}$ wait until $P_i$ has received strong support for READY(B, n, v) for some amendment B and has accepted B with sequence number n. $P_i$ can then switch to listening to v' as the current validation network and set min(v')=$n_{cont}$. (611)

After the validation network change protocol has finished, the current validation network to which node computing devices in the open network 300 will listen to for amendments to the decentralized database may be changed, for example, from the validation network 330 to the validation network 340. The next amendment, for example, block, validated by the validation network 340 may have a sequence number of at least $n_{cont}$. All correct node computing devices in the open network 300 may have decentralized database copies, such as the decentralized database copy 142, that are identical. The decentralized database copies may include every amendment that was validated by the validation network 330 for every sequence number less than $n_{cont}$ for which an amendment was validated before lock(v) was set to true, preventing the nodes of the open network 300 from accepting further amendments from the validation network 330.

Figure 7:
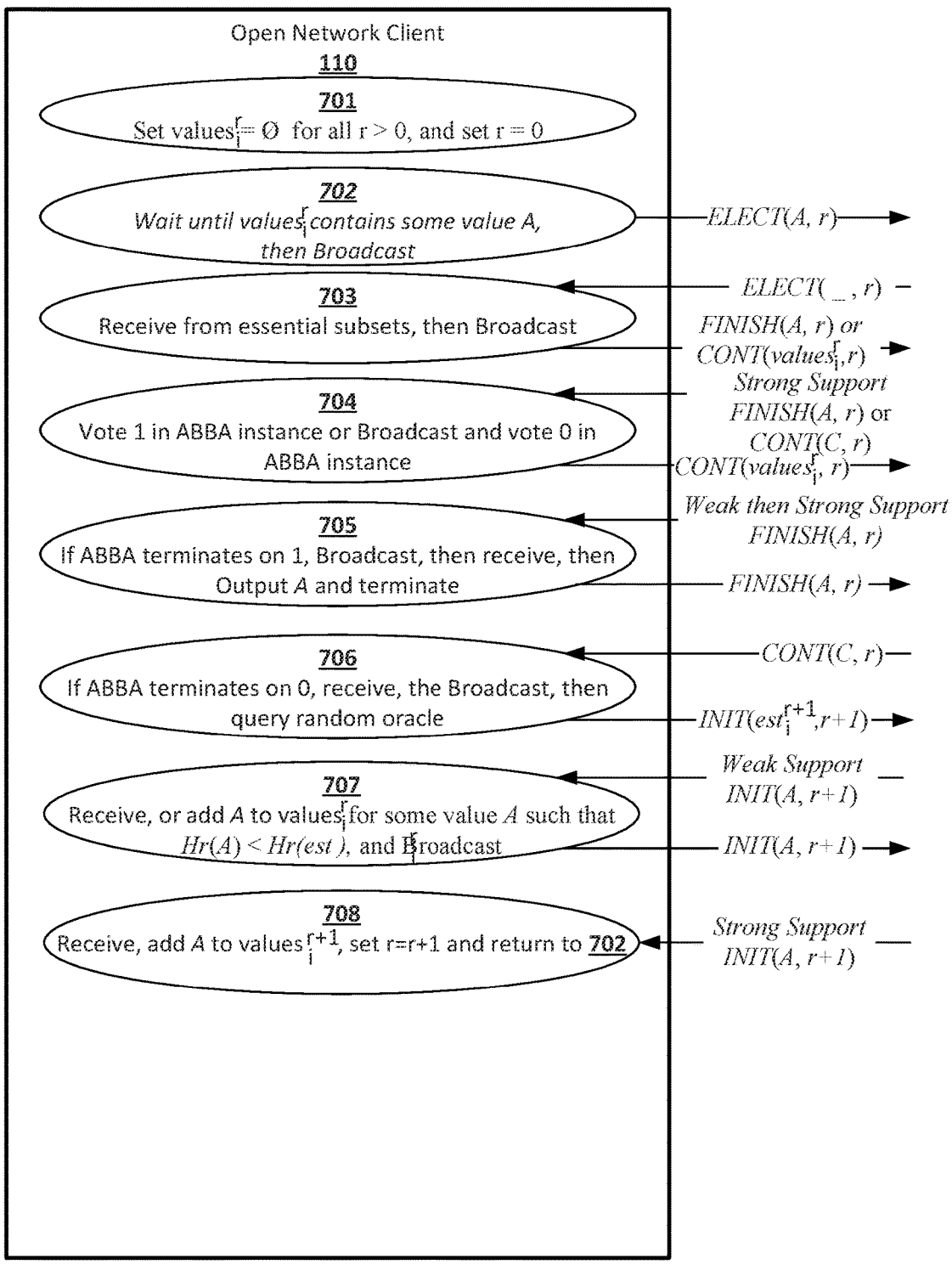
FIG. 7 shows an example arrangement suitable for random oracles in open networks according to an implementation of the disclosed subject matter.

FIG. 7 shows an example arrangement suitable for random oracles in open networks according to an implementation of the disclosed subject matter. As part of the validation network change protocol, the node computing devices of the validation network v' may run external validity MVBA to agree on a sequence number to be used as the minimum sequence number for the first amendment validated by the validation network v' and to ensure that all node computing devices in the open network 300 have accepted all previously validated amendments with sequence numbers below the minimum sequence number to ensure consistency among the decentralize database copies. For example, if the validation network change protocol is run to switch from the validation network 330 to the validation network 340, the node computing devices 100, 201, 205, 206, 210, and 211 may participate in an instance of external validity MVBA to determine a value for $n_{cont}$.

External validity MVBA may proceed in rounds and may use random oracles to give a random index to the value for each round. A collision resistant hash function H may be used. The collision resistant hash function H may be chosen so that, for every A, there may be a random oracle that returns H(A) drawn uniformly from the codomain of H. An infinite collection of random oracles $p_r$ may give values from the uniform space of integers modulo some large number, such as, for example, $2^{128}$. The value received from the random oracles $p_r$ may be $s_r$. Hash functions $H_r$ may be defined such that $H_r=H(A\|s_r)$. This may ensure that $H_r(A)$ may be a sequence of causal random variables for every r≥0. The random oracles $p_r$ may not be needed to guarantee the termination of external validity MVBA, but may reduce the expected time to termination from being linear in the number of valid inputs to be logarithmic in the expected number of valid inputs.

An external validity MVBA protocol run by a node computing device $P_i$ may be:

1. Set values$_i^r$=Ø for all r>0, and set r=0. (701)

2. Wait until values$_i^r$ contains some value A, then broadcast ELECT(A, r) if $P_i$ has not yet broadcast ELECT(_, r). (702)

3. For every essential subset S∈ES$_i$ for $P_i$, wait until there exists some subset T⊆S such that $|T|≥q_s$, $P_i$ has received ELECT(_, r) from every node computing device in T, and if any node computing device in T sent ELECT(A', r) to $P_i$ for some A', then A'∈values$_i^r$. After waiting, if values$_i^r$={A} for some value A, broadcast FINISH(A, r). Otherwise, broadcast CONT(values$_i^r$, r). (703)

4. Upon receiving strong support for FINISH(A, r), vote 1 in an ABBA instance tagged with ("STOP", r). Otherwise, upon receiving CONT(C, r) from any node computing device where |C|≥2 and C⊆values$_i^r$, broadcast CONT(values$_i^r$, r) and then vote 0 in the ABBA instance tagged with ("STOP", r). (704)

5. Wait until the ABBA instance tagged with ("STOP", r) terminates. If it terminates on 1, wait until $P_i$, receives weak support for FINISH(A, r) for some value A, then broadcast FINISH(A, r) if we haven't already broadcast FINISH(_, r). Then wait until $P_i$, receives strong support for FINISH(A, r) where A∈values$_i^r$, and then output A and terminate. (705) Otherwise, if the ABBA instance terminates on 0, wait until $P_i$, receives CONT(C, r) from some node computing device, where |C|≥2 and C ⊂ values$_i^r$, then broadcast CONT(values$_i^r$, r). If values$_i^r$ later grows, broadcast CONT(values$_i^r$, r) with the updated values$_i^r$. For every essential subset S∈ES$_i$ for $P_i$, wait until there exists some set C⊆values$_i^r$ such that we've received strong support for CONT(C, r), then query the random oracle $p_r$ for $s_r$, set est$_i^{r+1}$ to the value in values$_i^r$ that have a minimum $H_r$ hash, and broadcast INIT(est$_i^{r+1}$, r+1). (706)

6. Upon receiving weak support for INIT(A, r+1) for an arbitrary value A, or upon adding A to values$_i^r$ for some value A such that $H_r(A)<H_r(est_i^r)$, broadcast INIT(A, r+1) if $P_i$ has not already done so. (707)

7. Upon receiving strong support for INIT(A, r+1), add A to values$_i^{r+1}$, set r=r+1, and return to step 2 of the external validity MVBA protocol if $P_i$ has not already done so this round. (708)

The external validity MVBA protocol may be asynchronous, such that a node computing device that reaches any step in the protocol continues running that step until the termination of the external validity MVBA protocol. The external validity MVBA protocol may also allow for messages associated with round r+1 to be broadcast without waiting for an instance of ABBA initiated for round r to terminate.

A node computing device that initiates external validity MVBA during the validation network change protocol may use the highest sequence number of an amendment in its decentralized database copy as the value A. The output of the external validity MVBA may be the sequence number $n_{cont}$.

An ABBA protocol may be used by the node computing devices of the validation network v' participating in external validity MVBA to determine $n_{cont}$, for example, the node computing devices 100, 201, 205, 206, 210, and 211 of the validation network 340. An ABBA protocol run by a node computing device $P_i$ may be:
1. Upon receiving weak support for FINISH(x) for some binary value x, broadcast FINISH(x) if $P_i$ has not already broadcast FINISH(_).
2. Upon receiving strong support for FINISH(x), output x and terminate.
3. Set $values_i^r=\emptyset$ for all r≥0. Upon $P_i$ providing an input value $x_{in}$, set r=0 and $est_i^r=x_{in}$.
4. Broadcast INIT($est_i^r$, r).
5. Upon receiving weak support for INIT(x, r), broadcast INIT(x, r) if $P_i$ has not already broadcast INIT(x, r), although $P_i$ can broadcast both INIT(0, r) and INIT(1, r).
6. Upon receiving strong support for INIT(x, r), add x to $values_i^r$ and broadcast AUX(x, r) if we have not already broadcast AUX(_, r).
7. For every essential subset $S \in ES_i$ for $P_i$, wait until there exists some subset $T \subseteq S$ such that $|T| \geq q_s$, $P_i$ has received AUX(x, r) from every node computing device in T for some $x \in values_i^r$, although different values for x may be received from different node computing devices T.
8. Query a random value from a random oracle $k_r$ that is a random oracle for the uniform sample space over {0, 1} and place the random value in $s_r$.
9. If $|values_i^r|=2$, then set $est_i^{r+1}=s_r$. If $values_i^r=\{x\}$ for some x, then set $est_i^{r+1}=x$. If $values_i^r=\{s_r\}$, then additionally broadcast FINISH($s_r$) if $P_i$ has not already broadcast FINISH (_) Set r=r+1 and return to step 4 of the ABBA protocol.

The ABBA protocol may be asynchronous, so that an open network client running the ABBA protocol on a node computing device, for example, the open network client 110 on the node computing device 100, may keeping running reached steps of the ABBA protocol if the step has not been satisfied by the time the next step of the ABBA protocol is run. This may involve, for example, continuously checking FINISH messages as per steps 1 and 2 of the ABBA protocol even while executing the later steps of the ABBA protocol.

The output of an instance of the ABBA protocol called from an instance of the external validity MVBA protocol may be either a 0, indicating that the node computing devices of the validation network v', for example, the validation network 340, do not agree on a value A as the value for $n_{cont}$, or 1, indicating that the node computing devices do agree on the value A for $n_{cont}$.

Figure 8:
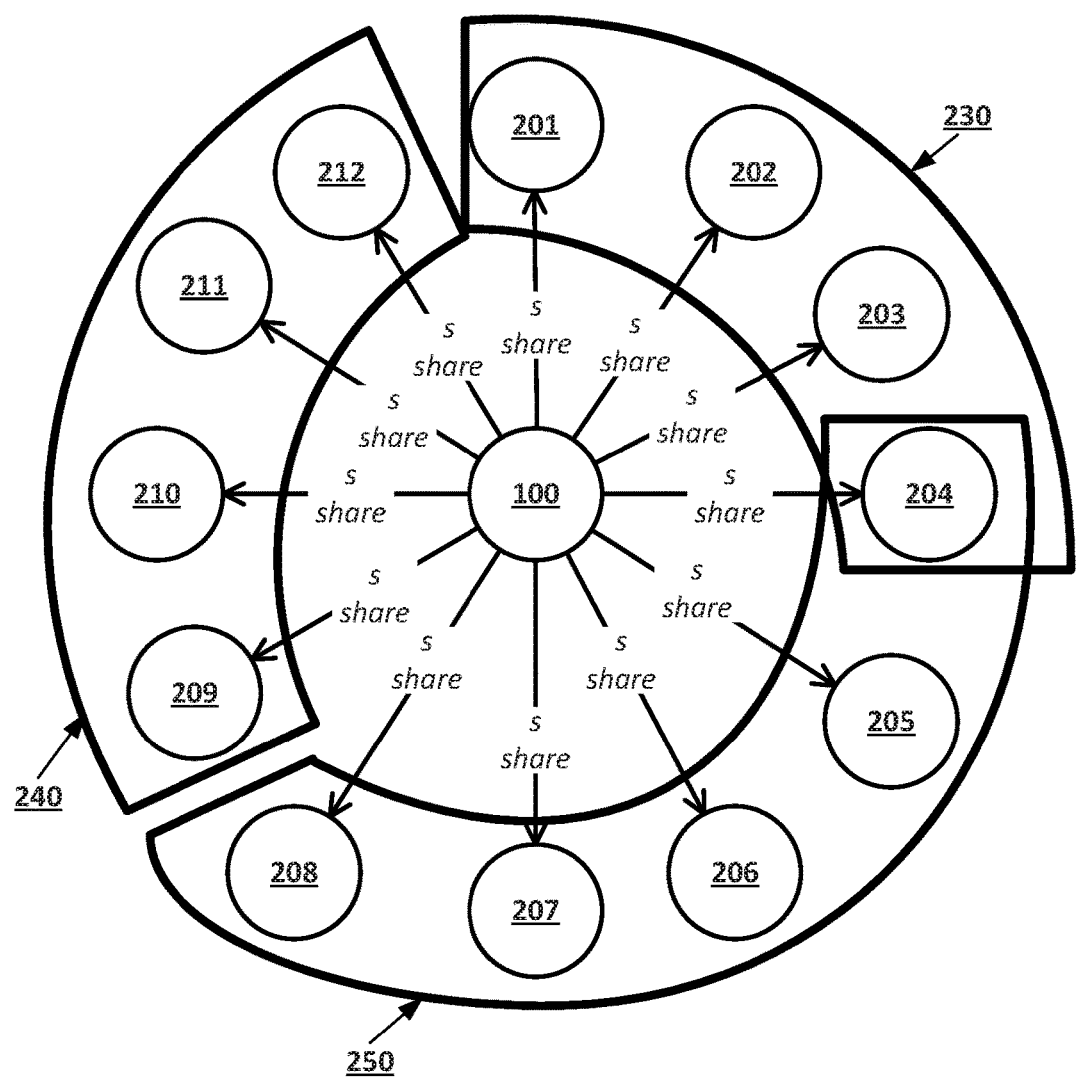
FIG. 8 shows an example arrangement suitable for random oracles in open networks according to an implementation of the disclosed subject matter.

FIG. 8 shows an example arrangement suitable for random oracles in open networks according to an implementation of the disclosed subject matter. The random oracles used by the external validity MVBA protocol may be part of the open network 300. For example, in the open network 300, a random oracle over the sample space S may be a black box that when queried by two linked honest node computing devices of the open network 300 returns the same value to each of the node computing devices. If such a random oracle returns s to a weakly connected, uncorrupt, honest node computing device $P_i$ of the open network 300, then there is some honest node computing device $P_j \in UNL_i$ such that s is a random value sampled from the sample space S and independent of the state of $P_j$ at the time $P_j$ queried the random oracle.

The random oracle may be implemented in the open network 300 by having a node computing device $P_i$ of the open network 300 choosing a random secrets and using asynchronous verifiable secret sharing (AVSS) to distribute $q_s$-threshold shares of s to each essential subset $S \in ES_i$ for $P_i$. For example, the open network client 110 of the node computing device 100 may distribute threshold shares of a secrets to the node computing devices 201, 202, 203, 204, 205, 206, 207, 208, 209, 210, 211, and 212. Additional node computing devices of the open network 300 may distribute shares of their own secrets in the same manner. The sum of the secrets may be perfectly random as long as any single secret is perfectly random. The node computing devices 300 may use any suitable consensus mechanism, such as, for example, external validity MVBA and ABBA, to agree on a set of secrets Y. A deterministic seed message M may be signed by any node computing device that has a share of any of secret in the set of secrets Y using that node computing devices share, generating a signature share for that node computing device. When a node computing device wishes to query the random oracle, the node computing device reveals its signature share that was generated when the node computing device used a share of a secret in Y to sign the message M. Once signatures over M have been gathered for every secret in the set of secrets Y, the node computing devices of the open network 300 may combine the signatures in a deterministic manner to create a common source of randomness that may be unpredictable as long as any secret in Y is unknown in advance.

Figure 9:
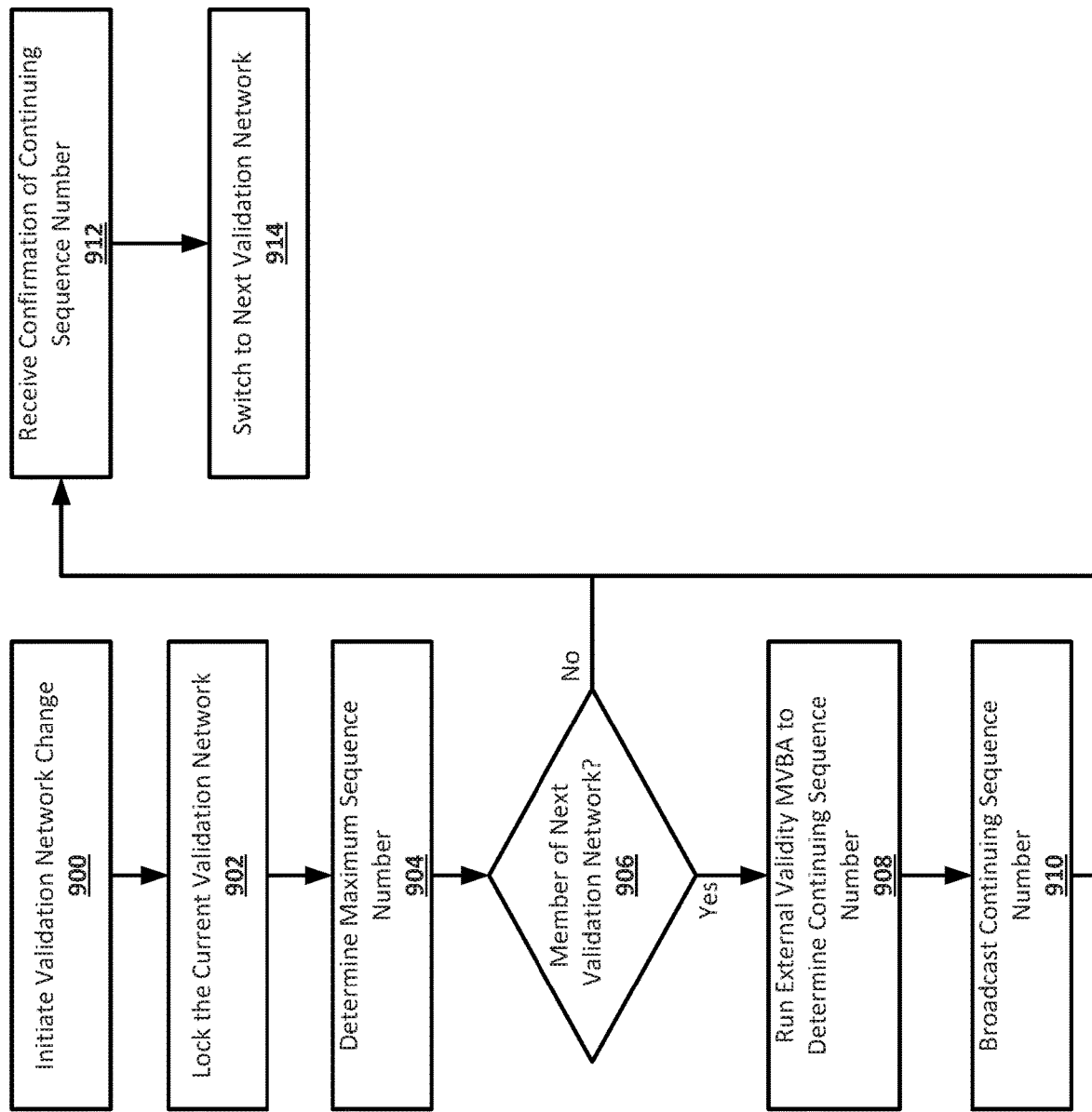
FIG. 9 shows an example procedure suitable for random oracles in open networks according to an implementation of the disclosed subject matter.

FIG. 9 shows an example procedure suitable for random oracles in open networks according to an implementation of the disclosed subject matter. At 900, a change in the validation network may be initiated. For example, the open network client 110 of the node computing device 100 may determine that the current validation network 330 of the open network 300 is failing, and may start the validation network change protocol to change the current validation network to the validation network 340. The open network client 110 may broadcast the intent to change to the validation network 330 and wait to receive confirmation of this broadcast from other node computing devices of the open network 300 as in steps 1, 2, and 3 of the validation network change protocol (601, 602, and 603).

At 902, the current validation network may be locked. For example, the open network client 110 may set a lock variable for the current validation network 330 to true as in step 4 of the validation network change protocol (604). This may prevent the open network client 110 from accepting any amendments to the decentralized database sent out by the current validation network 330 after the lock variable has been set to true. The open network client 110 may also determine the highest sequence number of an amendment applied to the decentralized database copy 142 before the lock variable was set to true and broadcast this sequence number to the open network 300.

At 904, a maximum sequence number may be determined. For example, the open network client 110 may receive sequence numbers from other node computing devices in the open network 300. The received sequence numbers may be broadcast by, for example, node computing devices in the essential subsets 230, 240, and 250, and may have been determined based on the highest sequence number of an amendment that the node computing devices applied to their decentralized database copies before setting the lock variable to true for the current validation network 330. The open network client 110 may determine the maximum sequence number as the highest sequence number received from any other node computing device in the open network 300, as in step 5 of the validation network change protocol (605).

At 906, If the node computing device is a member of the next validation network, flow may proceed to 908, otherwise flow proceeds to 912. For example, the node computing device 100 may determine whether it is a member node computing device of the validation network that will replace the current validation network. If the next validation network is, for example, the validation network 340, the node computing device 100 may determine that is a member of the next validation network.

At 908, external validity MVBA may be run to determine the continuing sequence number. For example, the node computing device 100 may be a member of the next validation network 340 along with the node computing devices 201, 205, 206, 210, and 211, all of which may run the external validity MVBA protocol as in step 6 of the validation network change protocol (606). The node computing devices 100, 201, 205, 206, 210, and 211 may, for example, use external validity MVBA to agree on a continuing sequence number that is higher than the maximum sequence number of any amendment that has been applied to a decentralized database copy in the open network 300.

At 910, the continuing sequence number may be broadcast. For example, after the completion of external validity MVBA, the node computing devices 100, 201, 205, 206, 210, and 211 of the validation network 340 may have come to an agreement on a maximum sequence number. The open network client 110 of the node computing device 100 may broadcast the maximum sequence number to the open network 300, as in step 6 of the validation network change protocol (606).

At 912, confirmation of the continuing sequence number may be received. For example, whether or not the node computing device 100 is a member of the next validation network, the node computing device 100 may wait to receive confirmation of the maximum sequence number from some number of node computing devices that are members of the next validation network as in step 7 of the validation network change protocol (607).

At 914, the next validation network may be switched to. For example, the open network client 110 of the node computing device 100 may switch to listening for amendments from the next validation network, for example, the validation network 340 of which the node computing device 100 may be a member, or the validation network 350, as in steps 8, 9, 10, and 11 of the validation network change protocol (608, 609, 610, 611).

Figure 10:
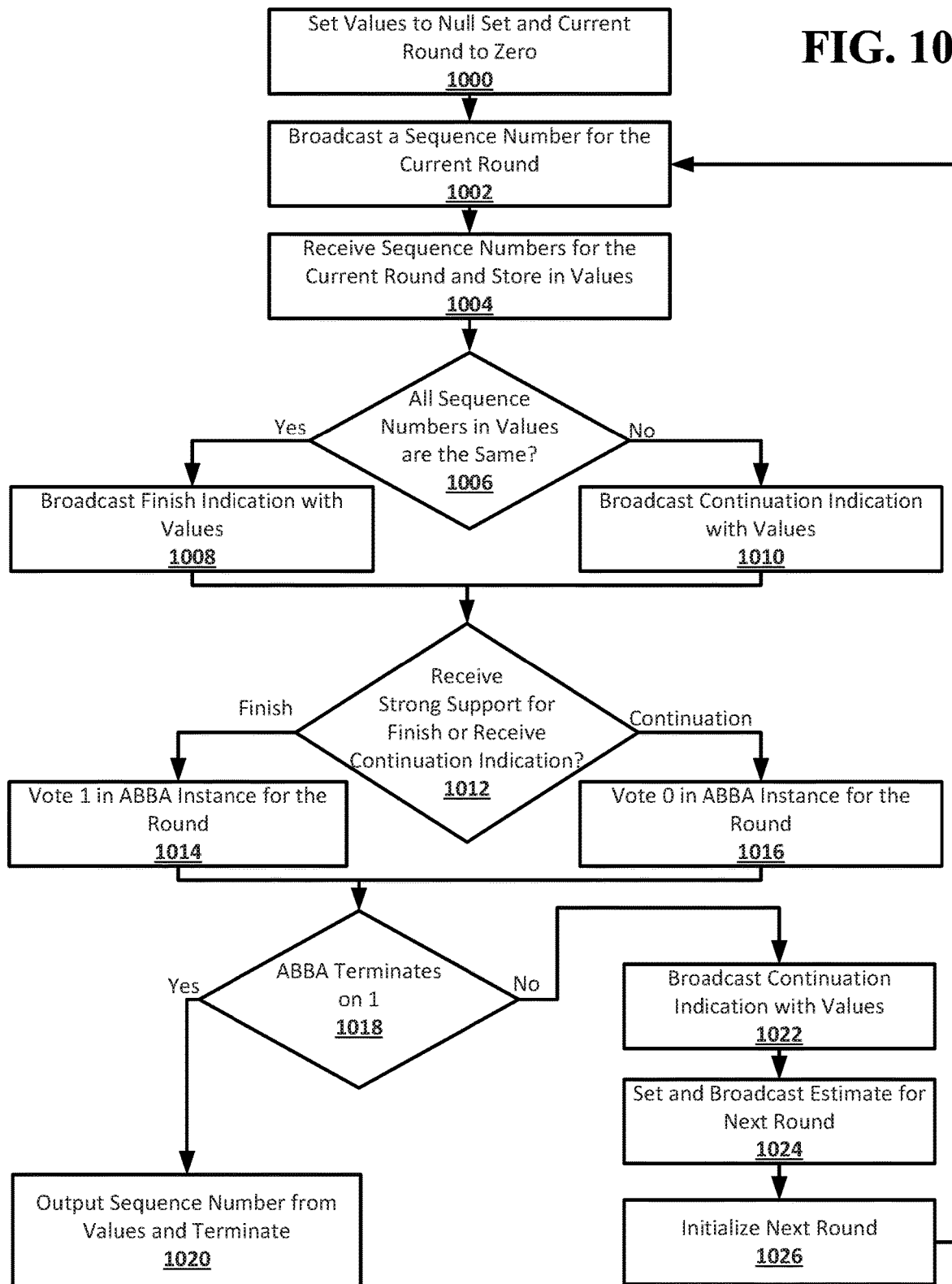
FIG. 10 shows an example procedure suitable for random oracles in open networks according to an implementation of the disclosed subject matter.

FIG. 10 shows an example procedure suitable for random oracles in open networks according to an implementation of the disclosed subject matter. At 1000, values may be set to the null set, and the current round may be set to zero. For example, the node computing device 100 may be a member of the next validation network during a change in the validation network for the open network 300. The open network client 110 may participate in external validity MVBA with other node computing devices in the next validation network, for example, the validation network 340, as in step 6 of the validation network change protocol. The open network client 110 may set a set of values to the null set, and a current round number to zero, as in step 1 of the external validity MVBA protocol (701).

At 1002, a sequence number may be broadcast for the current round. For example, the open network client 110 may broadcast, from the node computing device 100, a sequence number that may be the highest sequence number for an amendment that was applied to the decentralized database copy 142. The sequence number may broadcast to the node computing devices of the validation network 340, as in step 2 of the external validity MVBA protocol (702).

At 1004, sequence numbers for the current round may be received and stored in values. For example, the other node computing devices of the validation network 340 may also be running the external validity MVBA protocol and may have also broadcast sequence numbers as per step 2. The open network client 110 may receive the sequence numbers for the current round of external validity MVBA, as in step 3 of the external validity MVBA protocol (703).

At 1006, if all of the sequence numbers in the set of values are the same, flow may proceed to 1008. Otherwise, flow may proceed to 1010. For example, open network client may determine whether the sequence numbers received by the open network client 110 are the same, as in step 3 of the external validity MVBA protocol (703).

At 1008, a finish indication may be broadcast with the set of values. For example, the open network client 110 may broadcast the set of values, which may include only one unique sequence number, with a finish indication and the current round number, as in step 3 of the external validity MVBA protocol (703).

At 1010, a continuation indication may be broadcast with the set of values. For example, the open network client 110 may broadcast the set of values, which may include more than one unique sequence number, with a continuation indicating and the current round number, as in step 3 of the external validity MVBA protocol (703).

At 1012, if strong support for a finish indication is received, flow may proceed to 1014. If a continuation indication is received, flow may proceed 1016. For example, the open network client 110 may determine whether it first receives strong support for a finish indication with a particular sequence number or receives a continuation indication with a set of values that includes more than on unique sequence number, as in step 4 of the external validity MVBA protocol (704).

At 1014, a vote of 1 may be made in an ABBA instance for the round. For example, having received strong support for a finish indication with a particular sequence number, the open network client 110 may vote 1 in an ABBA instance for the current round of external validity MVBA, setting an estimate value used in the ABBA instance to 1, as in step 4 of the external validity MVBA protocol (704).

At 1016, a vote of 0 may be made in an ABBA instance for the round. For example, having received a continuation indication with a set of values including more than one unique sequence number, the open network client 110 may vote 0 in an ABBA instance for the current round of external validity MVBA, for example, setting an estimate value used in the ABBA instance to 0, as in step 4 of the external validity MVBA protocol (704).

At 1018, if the instance of ABBA for the current round terminates on 1, flow proceeds to 1020. Otherwise, if the instance of ABBA for the current round terminates on 0, flow proceeds to 1022. For example, the ABBA instance for the current round may terminate on the open network client 110 with a result of either 1 or 0 as in step 5 of the external validity MVBA protocol (705).

At 1020, a sequence number may be output from the set of values and the external validity MVBA may be terminated. For example, after the ABBA instance terminates on 1, the open network client 110 may wait to receive strong support for a finish indication with the sequence number for which the ABBA instance terminated on 1. The open network client 110 may output that sequence number, for example, to be used by the validation network change protocol running on the open network client 110, and terminate the instance of external validity MVBA, as in step 5 of the external validity MVBA protocol (705).

At 1022, a continuation indication may be broadcast with the set of values. For example, after the ABBA instance for the current round terminates on 0, the open network client 110 may broadcast a continuation indication with the set of values that may include more than one unique sequence number, as in step 5 of the external validity MVBA protocol (705).

At 1024, an estimate for the next round may be set. For example, the open network client 110 may query the random oracle of the open network 300, and concatenate the random value received from the random oracle to each of the sequence numbers in the set of values. The results of the concatenation may be hashed using a collision resistant hash function, and only the sequence number that results in the lowest hash may be set as the estimate for the next round and broadcast, as in step 5 of the external validity MVBA protocol (705).

At 1026, the next round of external validity MVBA may be initialized. For example, the open network client 110 may wait until it either receives weak support for an initialize indication with a sequence number, or until a sequence number with a hash that is lower than the hash of the sequence number set as an estimate for the next round is added to the set of values, and then broadcast an initialize indication with that sequence number. Once strong support is received for the initialize indication with a sequence number, that sequence number may be added to the set of values, the round number may be incremented, and flow may proceed back to 1002 to being the next round of external validity MVBA, as in steps 6 and 8 of the external validity MVBA protocol (707, 708).

Figure 11:
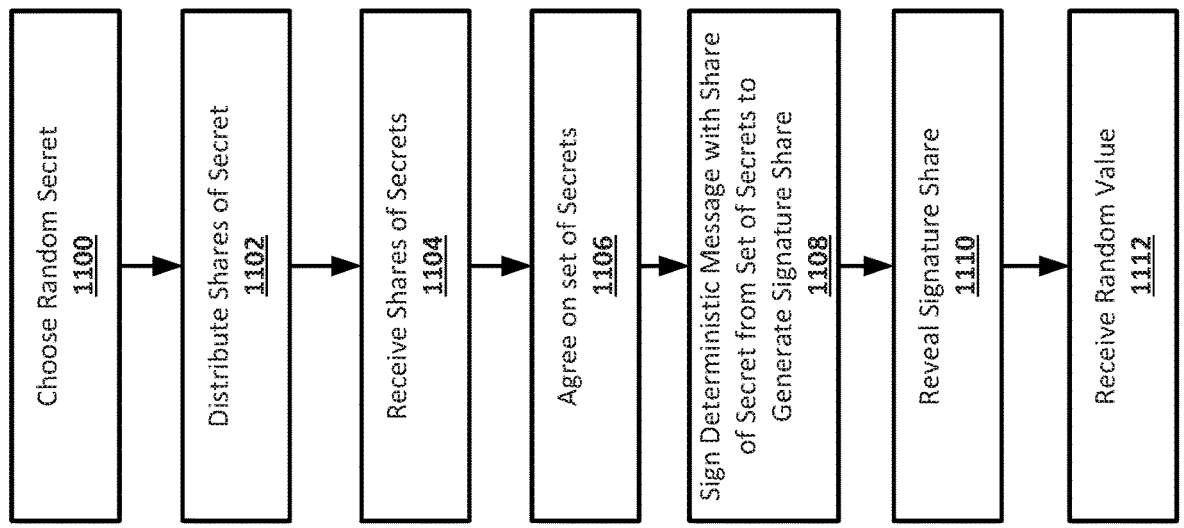
FIG. 11 shows an example procedure suitable for random oracles in open networks according to an implementation of the disclosed subject matter.

FIG. 11 shows an example procedure suitable for random oracles in open networks according to an implementation of the disclosed subject matter. At 1100, a random secret may be chosen. For example, the open network client 110 on the node computing device 100 may choose a random secret, which may be, for example, a numeric or alphanumeric value of any suitable size. The random secret may be chosen using any suitable generator with any suitable source of entropy.

At 1102, shares of the secret may be distributed. For example, the open network client 110 may divide the secret into a number of shares. The number of shares be, for example, $q_s$, which may be the number of non-faulty node computing devices that need to be in an essential subset of the node computing device 100. This random secret may be divided into a number of shares equal to the threshold number of shares for the random secret, such that all of the shares of the random secret may be needed to reconstruct the random secret. A threshold number of shares may be distributed to each essential subset of the node computing device 100. The shares of the random secret may be distributed using AVSS.

At 1104, shares of secrets may be received. For example, the open network client 110 of the node computing device 100 may receive shares of random secrets from node computing devices of which the node computing device 100 is a member of an essential subset of.

At 1106, a set of secrets may be agreed on. For example, the node computing devices may use any suitable consensus mechanism, including, for example, external validity MVBA and ABBA, to agree on a set of random secrets that have been distributed as secret shares by the node computing devices of the open network 300. The set of secrets may include any suitable number of secrets. Each random secret in the set of secrets may only be known to the node computing device that distributed the shares of the secret. The open network 300 may include mechanisms to prevent a single party from adding a large number of random secrets to the set of secrets, such as, for example, a small fee paid to the open network 300 for adding a random secret to the set of secrets.

At 1108, a deterministic seed message may be signed with a share of a secret. For example, the open network client 110 may use a share of a random secret that is in the set of random secrets for the open network 300 to sign a deterministic seed message. Every other node computing device of the open network 300 that has a share of a random secret in the set of random secrets may also use that share to sign the deterministic seed message. The deterministic message may be signed using a share of every secret in the set of random secrets. A node computing device signing the deterministic message with a share of a random secret may generate a signature share for that node computing device.

At 1110, a signature share used to sign the deterministic message may be revealed. For example, the open network client 110 may need to query the random oracle of the open network 300 as part of the external validity MVBA protocol. The open network client 110 may reveal the signature share that was generated by the open network client 110 signing deterministic seed message using a share of a random secret.

At 1112, a random value may be received. For example, after querying the random oracle by revealing the signature share, the open network client 110 may receive a random value from a source of randomness created through deterministic combination of the signatures of the deterministic seed message.

Figure 12:
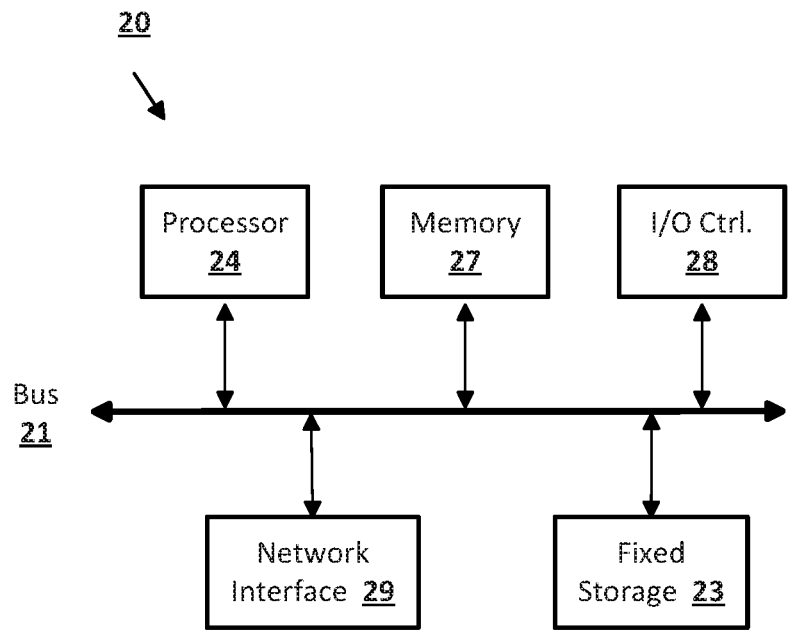
FIG. 12 shows a computer according to an embodiment of the disclosed subject matter.

Embodiments of the presently disclosed subject matter may be implemented in and used with a variety of component and network architectures. FIG. 12 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 13.

Many other devices or components (not shown) may be connected in a similar manner, such as document scanners, digital cameras, auxiliary, supplemental, or backup systems, or the like. Conversely, all of the components shown in FIG. 12 need not be present to practice the present disclosure. The components can be interconnected in different ways from that shown. The operation of a computer such as that shown in FIG. 12 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 13:
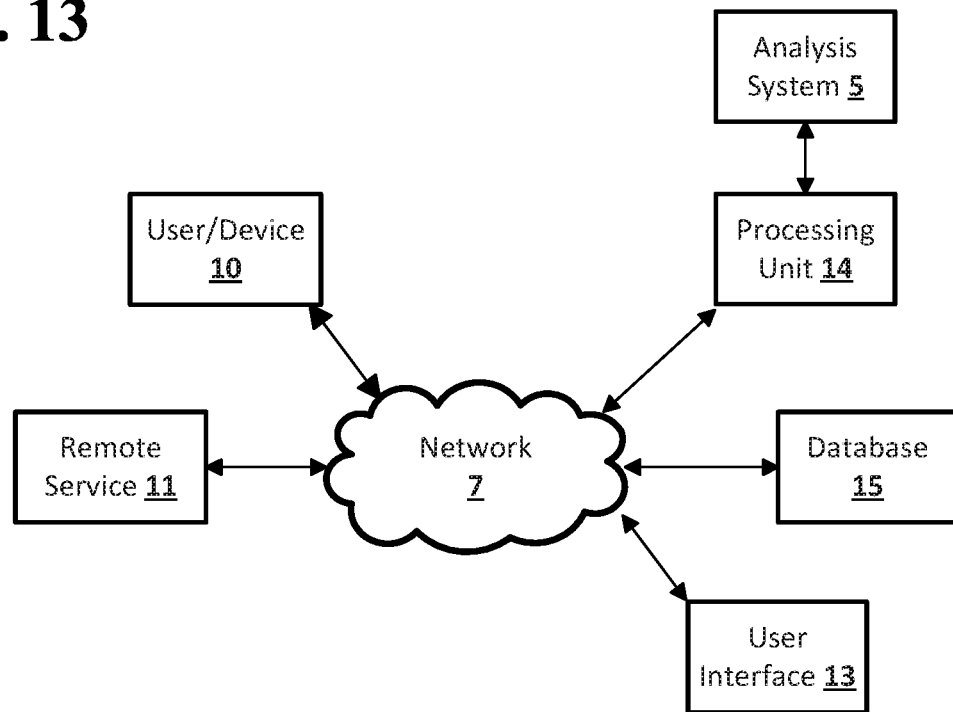
FIG. 13 shows a network configuration according to an embodiment of the disclosed subject matter.

FIG. 13 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method performed on decentralized data processing apparatus comprising:
choosing, by a first node computing device of an open network, a random secret, wherein the random secret is a numeric or alphanumeric value generated from a source of entropy;
distributing, by the first node computing device, a number of shares divided from the random secret to a plurality of destination computing devices of the open network that are members of essential subsets for the first node computing device, wherein the number of shares are distributed using asynchronous verifiable secret sharing (AVSS) mechanism;
receiving, by the first node computing device, a share of a random secret from a second node computing device of the plurality of destination computing devices, wherein the first node computing device is a member of an essential subset of the second node computing device;
signing, by the first node computing device, a deterministic seed message using the share of the random secret received from the second node computing device to generate a signature share;
revealing, by the first node computing device, the generated signature share to the open network; and
in response to revealing the generated signature share, receiving, by the first node computing device, a random value which is created from a source of randomness through deterministic combination of the signatures of the deterministic seed message.

2. The method of claim 1, wherein the shares of the random secret distributed by the node computing device are qs-threshold shares, wherein qs is the number of correct node computing devices that are required to be in an essential subset of the node computing device.

3. The method of claim 1, wherein the deterministic seed message is further signed using shares of additional random secrets.

4. The method of claim 1, wherein the deterministic seed message is further signed by every node computing device in the open network that has a share of any random secret using that share.

5. The method of claim 1, wherein the random value is generated by deterministically combining signatures over the deterministic seed message generated by signing of the deterministic seed message with shares of random secrets by node computing devices of the open network.

6. The method of claim 1, wherein the shares of the random secret are distributed using asynchronous verifiable secret sharing.

7. The method of claim 1, further comprising using the random value during a round of external validity multi-valued Byzantine agreement to determine a value to use to initialize a next round of external validity multi-valued Byzantine agreement.

8. The method of claim 1, wherein the random value comprises a number from the uniform space of integers modulo $2^{128}$.

9. A computer-implemented system for decentralized data processing comprising:
a processor device on a first node computing device configured to;
choose a random secret, wherein the random secret is a numeric or alphanumeric value generated from a source of entropy, distribute a number of shares divided from the random secret to a plurality of destination computing devices that are members of essential subsets for the first node computing device, wherein the number of shares are distributed using asynchronous verifiable secret sharing (AVSS) mechanism, receive a share of a random secret from a second node computing device of the plurality of destination computing devices, wherein the first node computing device is a member of an essential subset of the second node computing device, sign a deterministic seed message using the share of the random secret received from the second node computing device to generate a signature share, reveal the generated signature share to the open network, and in response to revealing the generated signature share, receive a random value which is created from a source of randomness through deterministic combination of the signatures of the deterministic seed message.

10. The system of claim 9, wherein the shares of the random secret distributed by the node computing device are qs-threshold shares, wherein qs is the number of correct node computing devices that are required to be in an essential subset of the node computing device.

11. The system of claim 9, wherein the deterministic seed message is further signed using shares of additional random secrets.

12. The system of claim 9, wherein the deterministic seed message is further signed by every node computing device in the open network that has a share of any random secret using that share.

13. The system of claim 9, wherein the random value is generated by deterministically combining signatures over the deterministic seed message generated by signing of the deterministic seed message with shares of random secrets by node computing devices of the open network.

14. The system of claim 9, wherein the shares of the random secret are distributed using asynchronous verifiable secret sharing.

15. The system of claim 9, wherein the processor is further configured to use the random value during a round of external validity multi-valued Byzantine agreement to determine a value to use to initialize a next round of external validity multi-valued Byzantine agreement.

16. The system of claim 9, wherein the random value comprises a number from the uniform space of integers modulo $2^{128}$.

17. A system for decentralized data processing comprising:

one or more computers and one or more storage devices storing instructions which are operable, when executed by the one or more computers, to cause the one or more computers to perform operations comprising:

choosing, by a first node computing device of an open network, a random secret, wherein the random secret is a numeric or alphanumeric value generated from a source of entropy;

distributing, by the first node computing device, a number of shares divided from the random secret to a plurality of destination computing devices of the open network that are members of essential subsets for the first node computing device, wherein the number of shares are distributed using asynchronous verifiable secret sharing (AVSS) mechanism;

receiving, by the first node computing device, a share of a random secret from a second node computing device of the plurality of destination computing devices, wherein the first node computing device is a member of an essential subset of the second node computing device;

signing, by the first node computing device, a deterministic seed message using the share of the random secret received from the second node computing device to generate a signature share;

revealing, by the first node computing device, the generated signature share to the open network; and receiving, by the first node computing device, a random value which is created from a source of randomness through deterministic combination of the signatures of the deterministic seed message.

18. The system of claim 17, wherein the shares of the random secret distributed by the node computing device are qs-threshold shares, wherein qs is the number of correct node computing devices that are required to be in an essential subset of the node computing device.

19. The system of claim 17, wherein the deterministic seed message is further signed using shares of additional random secrets.

20. The system of claim 17, wherein the random value is generated by deterministically combining signatures over the deterministic seed message generated by signing of the deterministic seed message with shares of random secrets by node computing devices of the open network.

* * * * *